United States Patent
Kitamura et al.

(10) Patent No.: US 9,009,209 B2
(45) Date of Patent: Apr. 14, 2015

(54) PROCESSOR, CONTROL METHOD OF PROCESSOR, AND COMPUTER READABLE STORAGE MEDIUM STORING PROCESSING PROGRAM FOR DIVISION OPERATION

(75) Inventors: Kenichi Kitamura, Kawasaki (JP); Shiro Kamoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 12/836,061

(22) Filed: Jul. 14, 2010

(65) Prior Publication Data

US 2011/0022646 A1 Jan. 27, 2011

(30) Foreign Application Priority Data

Jul. 21, 2009 (JP) .................................. 2009-170258

(51) Int. Cl.
*G06F 7/52* (2006.01)
*G06F 7/535* (2006.01)
*G06F 7/44* (2006.01)

(52) U.S. Cl.
CPC ...................................... *G06F 7/535* (2013.01)

(58) Field of Classification Search
USPC ......................................... 708/504, 650–656
See application file for complete search history.

(56) References Cited

U.S. PATENT DOCUMENTS

| | | | | |
|---|---|---|---|---|
| 4,760,550 A * | 7/1988 | Katzman et al. | ............. | 708/504 |
| 5,339,267 A * | 8/1994 | Ito | ................. | 708/650 |
| 5,493,523 A * | 2/1996 | Huffman | ...................... | 708/655 |
| 5,576,982 A * | 11/1996 | Wu et al. | ....................... | 708/211 |
| 5,596,519 A * | 1/1997 | Van Aken et al. | ............. | 708/655 |
| 5,644,524 A * | 7/1997 | Van Aken et al. | ............. | 708/655 |
| 5,805,489 A * | 9/1998 | Fernando | ........................ | 708/655 |
| 5,825,681 A * | 10/1998 | Daniel et al. | ................... | 708/654 |
| 6,477,557 B1 * | 11/2002 | Yano | .............................. | 708/655 |
| 6,751,645 B1 * | 6/2004 | Gorshtein et al. | ............. | 708/650 |
| 7,539,720 B2 * | 5/2009 | Olson et al. | ..................... | 708/504 |
| 7,584,237 B1 * | 9/2009 | Tan et al. | ....................... | 708/650 |
| 7,873,687 B2 * | 1/2011 | Gerwig et al. | ................... | 708/504 |
| 2004/0249877 A1* | 12/2004 | Gerwig et al. | ................ | 708/650 |
| 2006/0129624 A1* | 6/2006 | Abdallah et al. | .............. | 708/650 |
| 2006/0129625 A1* | 6/2006 | Olson et al. | .................... | 708/650 |
| 2007/0083583 A1* | 4/2007 | Gerwig et al. | ................ | 708/490 |
| 2008/0275931 A1* | 11/2008 | Schmookler | .................. | 708/501 |
| 2009/0172069 A1* | 7/2009 | Avss et al. | ...................... | 708/653 |
| 2009/0216824 A1* | 8/2009 | Weinberg et al. | ............. | 708/504 |
| 2010/0174891 A1* | 7/2010 | Nomoto | ......................... | 712/222 |
| 2010/0250639 A1* | 9/2010 | Olson et al. | .................... | 708/504 |

FOREIGN PATENT DOCUMENTS

| JP | 4-291418 | 10/1992 |
|---|---|---|
| JP | 2002-175179 | 6/2002 |

* cited by examiner

*Primary Examiner* — Chat Do
*Assistant Examiner* — Matthew Sandifer
(74) *Attorney, Agent, or Firm* — Staas & Halsey LLP

(57) ABSTRACT

A processor for dividing by calculating repeatedly an n-bit width partial quotient includes, a dividend zero count value counter that counts a dividend zero count value, a divisor zero count value counter that counts a divisor zero count value, a correction value calculator that calculates a correction value to a loop count value, a correction loop count value calculator that calculates a correction loop count value, a dividend shift unit that shifts leftward an absolute value of the dividend by the dividend zero count value and shifts rightward the leftward-shifted absolute value of the dividend by the correction value, a divisor shift unit that shifts leftward an absolute value of the divisor by the divisor zero count value, and a division loop operation unit that divides based on an output value from the dividend shift unit, an output value from the divisor shift unit, and the correction loop count value.

15 Claims, 27 Drawing Sheets

FIG. 10

| a | b | D | SEL |
|---|---|---|-----|
| 0 | 0 | 00 | p |
| 0 | 1 | 01 | q |
| 1 | 0 | 10 | r |
| 1 | 1 | 11 | q |

FIG. 12

DIVIDEND A = 1000 0111 (135(10))

DIVISOR B = 0011 1100 (60(10))

⬇ PRE-OPERATION (RELATED ART)

LOOP COUNT VALUE LC = 3

DIVIDEND A' = 1000 0111

DIVISOR B' = 1111 0000

 QUOTIENT CALCULATION OPERATION OF N BITS (FIRST CYCLE)

LOOP COUNT VALUE LC = 1, PARTIAL QUOTIENT D = 01

INTERIM REMAINDER C = 0001 1110

INTERIM REMAINDER INITIAL VALUE C' = 00 0111 1000

DIVISOR B' = 1111 0000

 QUOTIENT CALCULATION OPERATION OF N BITS (SECOND CYCLE)

LOOP COUNT VALUE LC = -1, PARTIAL QUOTIENT D = 00

INTERIM REMAINDER C = 0111 1000

INTERIM QUOTIENT (FINAL QUOTIENT) D' = 0100 (4(10))

FIG. 13

DIVIDEND A = 1000 0111 ($135_{(10)}$)

DIVISOR B = 0011 1100 ($60_{(10)}$)

↓ PRE-OPERATION 1

LOOP COUNT VALUE LC = 3, CORRECTION VALUE CR = 1

DIVIDEND = 0 1000 0111

DIVISOR = 0 0011 1100

↓ PRE-OPERATION 2

CORRECTION LOOP COUNT VALUE LC' = 4

DIVIDEND A' = 0 1000 0111

DIVISOR B' = 1 1110 0000

⇓ QUOTIENT CALCULATION OPERATION OF N BITS (FIRST CYCLE)

CORRECTION LOOP COUNT VALUE LC' = 2, PARTIAL QUOTIENT D = 00

INTERIM REMAINDER C = 1 0000 1110

INTERIM REMAINDER INITIAL VALUE C' = 100 0011 1000

DIVISOR B' = 1 1110 0000

⇓ QUOTIENT CALCULATION OPERATION OF N BITS (SECOND CYCLE)

CORRECTION LOOP COUNT VALUE LC' = 0, PARTIAL QUOTIENT D = 10

INTERIM REMAINDER C = 0 0111 1000

INTERIM QUOTIENT (FINAL QUOTIENT) D' = 0010 ($2_{(10)}$)

FIG. 14

DIVIDEND A= 0011 0111 0001 ($881_{(10)}$)
DIVISOR B= 0000 0011 1111 ($63_{(10)}$)
↓ PRE-OPERATION (RELATED ART)

LOOP COUNT VALUE LC = 5
DIVIDEND A'= 1101 1100 0100
DIVISOR B'= 1111 1100 0000

⇓ QUOTIENT CALCULATION OPERATION OF N BITS (FIRST CYCLE)

LOOP COUNT VALUE LC = 1, PARTIAL QUOTIENT D = 0110
INTERIM REMAINDER C = 1111 1010 0000
INTERIM REMAINDER INITIAL VALUE C'= 1111 1010 0000 0000
DIVISOR B'= 1111 1100 0000

⇓ QUOTIENT CALCULATION OPERATION OF n BITS (SECOND CYCLE)

LOOP COUNT VALUE LC = -3, PARTIAL QUOTIENT D = 1111
INTERIM REMAINDER C= 1101 1100 0000
INTERIM QUOTIENT (FINAL QUOTIENT) D'= 0110 1111 ($111_{(10)}$)

FIG. 15

DIVIDEND A = 0011 0111 0001 ($881_{(10)}$)

DIVISOR B = 0000 0011 1111 ($63_{(10)}$)

⬇ PRE-OPERATION 1

LOOP COUNT VALUE LC = 5, CORRECTION VALUE CR = 3

DIVIDEND = 000 0011 0111 0001

DIVISOR = 000 0000 0011 1111

⬇ PRE-OPERATION 2

CORRECTION LOOP COUNT VALUE LC' = 8

DIVIDEND A' = 000 1101 11000 0100

DIVISOR B' = 111 1110 0000 0000

⬇ QUOTIENT CALCULATION OPERATION OF n BITS (FIRST CYCLE)

CORRECTION LOOP COUNT VALUE LC' = 4, PARTIAL QUOTIENT D = 0000

INTERIM REMAINDER C = 110 1100 0010 0000

INTERIM REMAINDER INITIAL VALUE C' = 110 1100 0100 0000 0000

DIVISOR B' = 111 1110 0000 0000

⬇ QUOTIENT CALCULATION OPERATION OF n BITS (SECOND CYCLE)

CORRECTION LOOP COUNT VALUE LC' = 0, PARTIAL QUOTIENT D = 1101

INTERIM REMAINDER C = 111 1100 0000 0000

INTERIM QUOTIENT (FINAL QUOTIENT) D' = 0000 1101 ($13_{(10)}$)

FIG. 21

| CONTROL STATE | | ST0 | ST1 | ST2 | ST3 |
|---|---|---|---|---|---|
| SEL1 | s | 1 | 0 | x | x |
| | t | 0 | 1 | x | x |
| SEL2 | u | x | 1 | 0 | x |
| | v | x | 0 | 1 | x |

PRE-OPERATION: ST0, ST1, ST2
DIVISION LOOP OPERATION: ST3

PROCESSOR, CONTROL METHOD OF PROCESSOR, AND COMPUTER READABLE STORAGE MEDIUM STORING PROCESSING PROGRAM FOR DIVISION OPERATION

CROSS-REFERENCE TO RELATED APPLICATIONS

This application is based upon and claims priority to prior Japanese Patent Application No. 2009-170258 filed on Jul. 21, 2009 in the Japan Patent Office, the entire contents of which are incorporated herein by reference.

FIELD

Various embodiments described herein relate to a processor, a control method of the processor, and a computer readable recording medium storing a processing program.

BACKGROUND

Available as one of the calculation techniques to produce a quotient in a division operation is a "loop operation". In the loop operation, a subtract operation or an add operation (or only a subtract operation) of a divisor is repeated to a dividend or an interim remainder. Recovery division method, non-recovery division method, and Sweeny-Robertson-Tocher (SRT) division are typical of division operation techniques using the loop operation.

FIG. 25 illustrates a division operation based on the loop operation.

The division operation based on the loop operation is divided into three major processes of a pre-operation 910, a loop operation 920, and a post-operation 930. The loop operation 920 includes a partial quotient calculation operation 921.

In the pre-operation 910, an absolute value operation and a left shift operation modify a data format of a dividend and a divisor on which the loop operation 920 is performed. A loop count is calculated in the partial quotient calculation operation 921 in the loop operation 920. If a divider circuit calculates a partial quotient of 1 bit at each cycle of the partial quotient calculation operation 921, a circuit calculating the loop count of the partial quotient calculation operation 921 is referred to as a "loop counter". And, the total loop count needed to finish calculating the partial quotient of 1 bit is referred to as a "loop count value".

The loop count value is calculated based on a leading zero count (LZC) of each of the dividend and the divisor. The LZC refers to the number of continued 0s ("zeros") from the most significant bit (MSB) of input binary data. LZC_A and LZC_B represent an LZC of the dividend and an LZC of the divisor, respectively, and the loop count value LC is calculated in accordance with the following equation (1):

$$LC = LZC\_B - LZC\_A + 1 \quad (1)$$

In the loop operation 920, mainly, the partial quotient calculation operation 921 is repeated to calculate a partial quotient of 1 bit. In the partial quotient calculation operation 921, a divisor is added to or subtracted from a dividend or an interim remainder (hereinafter also referred to as addition and subtraction of a divisor). A partial quotient, an interim quotient and an interim remainder are calculated based on a comparison between the results of the addition and subtraction, a loop count is subjected to a subtract operation, and the interim remainder is leftward shifted. In the post-operation 930, the interim quotient calculated in the loop operation 920 is corrected in order to calculate a final quotient.

The loop count value represents a bit width of the final quotient and represents the loop count of the partial quotient calculation operation 921 at the same time. As previously discussed, the loop count is determined from the dividend and the divisor. The loop count value is decremented by 1 each time the partial quotient calculation operation 921 is executed. When the loop count becomes "0", the loop operation 920 ends.

The interim remainder refers to a value that results from adding a divisor to or subtracting a divisor from a dividend in the partial quotient calculation operation 921. At a first cycle of the partial quotient calculation operation 921, the addition and subtraction of the divisor is performed on the dividend, but at second and subsequent cycles, the addition and subtraction of the divisor is performed on an interim remainder calculated through an immediately preceding partial quotient calculation operation 921. For simplicity of explanation, the addition and subtraction of the divisor in the partial quotient calculation operation 921 is performed on an interim remainder including a dividend.

The partial quotient is a value that results from comparing an interim remainder as a result of the addition and subtraction with a divisor. The interim quotient is a value that results from summing the partial quotients, each partial quotient obtained at each execution of the partial quotient calculation operation 921.

The division operation is expedited by calculating partial quotients of a plurality of bits in a single partial quotient calculation process. In the division operation, the term Radix-$2^n$ may be used in accordance with a bit width n of a partial quotient determined in one execution cycle (hereinafter simply referred to as "cycle") of the partial quotient calculation process. If the radix of an operation in one cycle is $2^j$ in the division of Radix-$2^n$, k add and subtract operations and k comparison operations are performed per cycle. Partial quotients of the n bits (n=j×k, where each of j and k is an integer of 1 or larger) per cycle are thus calculated.

If n≥2, partial quotients of a plurality of bits are calculated per cycle. Unlike the case of n=1, the loop operation is performed in response to a speed responsive to a multiple of n and then the final quotient is calculated. The division operation of calculating the partial quotient of a plurality of bits at a cycle is referred to the "high-radix division method".

A process of calculating a partial quotient of n bits at a cycle is here referred to as an "n-bit partial quotient calculation operation". If the n-bit partial quotient calculation operation is performed once with n≥2 and k=1, an operation of comparing the dividend or the interim remainder with the divisor causes partial quotients of j (=n) bits at a time. Each time the comparison operation is performed, n is subtracted from the loop count value.

If the n-bit partial quotient calculation operation is performed once with n≥2 and j=1, the operation of comparing the dividend or the interim remainder with the divisor is performed by k (=n) times in series. One cycle of comparison operation calculates a partial quotient of one bit, and "1" is subtracted from the loop count value. If the comparison operation is performed by k times at one cycle, interim quotients of n bits are thus obtained.

The partial quotients of n bits are determined at one cycle in the Radix-$2^n$ division operation. As previously discussed, the loop count value represents the bit width of the final quotient. In the Radix-$2^n$ division operation, n is subtracted from the loop count value per cycle. If the initial value of the loop count value is a multiple of n, the loop count value at the end of the loop operation 920 is "0". If the initial value of the loop count value is not a multiple of n, the loop count value at the end of the loop operation 920 exceeds "0", becoming a negative value. In such a case, a correct partial quotient may not be calculated in the final n-bit partial quotient calculation operation in the loop operation 920, and the final quotient becomes an erroneous value having a bit width not being n. If the initial value of the loop count value is not a multiple of n, an additional operation illustrated in FIGS. 26 and 27 is performed to have a correct final quotient.

FIG. 26 illustrates a first process example that is applicable if the initial value of the loop count value is not a multiple of n. FIG. 27 illustrates a second process example that is applicable if the initial value of the loop count value is not a multiple of n. In FIGS. 26 and 27, like elements are designated with like reference numerals in FIG. 25.

FIGS. 26 and 27 illustrate a loop operation 920a in which an n-bit partial quotient calculation operation 921a is repeated to calculate partial quotients of n bits. Each time the n-bit partial quotient calculation operation 921a is executed in the loop operation 920a, n is subtracted from the loop count value. The n-bit partial quotient calculation operation 921a is repeated until the loop count value becomes zero or less.

In the first process example, a quotient fix operation 940 may be performed subsequent to the end of the loop operation 920a as illustrated in FIG. 26. The quotient fix operation 940 corrects an interim quotient calculated at this point of time to be a correct value. In the quotient fix operation 940, for example, an operation reverse to the addition and subtraction and the comparison operation in the n-bit partial quotient calculation operation 921a is executed by the same number of times as the number of times by which the addition and subtraction and the comparison operation have been abundantly executed.

The division operation becomes complex, because the quotient fix operation 940 is added. To execute the quotient fix operation 940, a divider circuit further needs a circuit which records necessary information on a process content for the addition and subtraction and the comparison operation in the n-bit partial quotient calculation operation 921a and a circuit which performs the addition and subtraction and the comparison operation in a reverse procedure. Accordingly, the circuit scale of a divider circuit may increase, and power consumption of the divider circuit may increase accordingly, and latency time of the divider circuit may be prolonged.

In the second process example, a remainder fix operation 922 is executed as desired based on the loop count value at the point before executing the n-bit partial quotient calculation operation 921a in the loop operation 920a as illustrated in FIG. 27. A particular process may be performed on the value of the interim remainder in the remainder fix operation 922. For example, the comparison results may not be reflected in the output process of the interim remainder when the loop count value is less than n at a point of time.

Similarly to the first process example, the division operation becomes complex in the second process example, because the remainder fix operation 922 is added. In the divider circuit, a circuit performing the remainder fix operation 922 needs to be included in a circuit performing the loop operation 920a. For this reason, the circuit performing the remainder fix operation 922 operates regardless of the current loop count value each time the n-bit partial quotient calculation operation 921a is performed. Not only the divider circuit becomes large in scale but also power is further consumed by otherwise unnecessary operation if the current loop count value is n or larger. If the final remainder is output in the middle of the loop operation 920a, a circuit such as a selector may further be arranged as a data path to exit the loop operation 920a.

In one example of division operation, the dividend and the divisor are shifted in the pre-operation such that a difference between the number of shifts of dividend and the number of shifts of divisor becomes a multiple of n. The number of bits calculated by the divider circuit thus becomes a multiple of n. In another example of division operation, an amount of division operation is intended to be reduced per bit. In this example of division operation, a divisor is shifted leftward by 16 bits, and "1" is subtracted from the shifted divisor. A resulting value is used in the loop operation.

A typical system is described Japanese Laid-open Patent Publication No. 4-291418.

SUMMARY

According to an aspect of the invention, a processor for dividing by calculating repeatedly an n-bit width partial quotient includes, a dividend zero count value counter that counts a dividend zero count value, a divisor zero count value counter that counts a divisor zero count value, a correction value calculator that calculates a correction value to a loop count value, a correction loop count value calculator that calculates a correction loop count value, a dividend shift unit that shifts leftward an absolute value of the dividend by the dividend zero count value and shifts rightward the leftward-shifted absolute value of the dividend by the correction value, a divisor shift unit that shifts leftward an absolute value of the divisor by the divisor zero count value, and a division loop operation unit that divides based on an output value from the dividend shift unit, an output value from the divisor shift unit, and the correction loop count value.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 10 illustrates a truth table illustrating an input-output relationship of a decoder of FIG. 9;

FIG. 12 illustrates an example of division operation of related art with n=2;

FIG. 13 illustrates an example of division operation of n=2 wherein a pre-operation of an embodiment is applied;

FIG. 14 illustrates an example of division operation of related art with n=4;

FIG. 15 illustrates an example of division operation of n=4 wherein a pre-operation of an embodiment is applied;

FIG. 21 illustrates a correspondence between a control status and a select signal;

DETAILED DESCRIPTION

Figure 1:
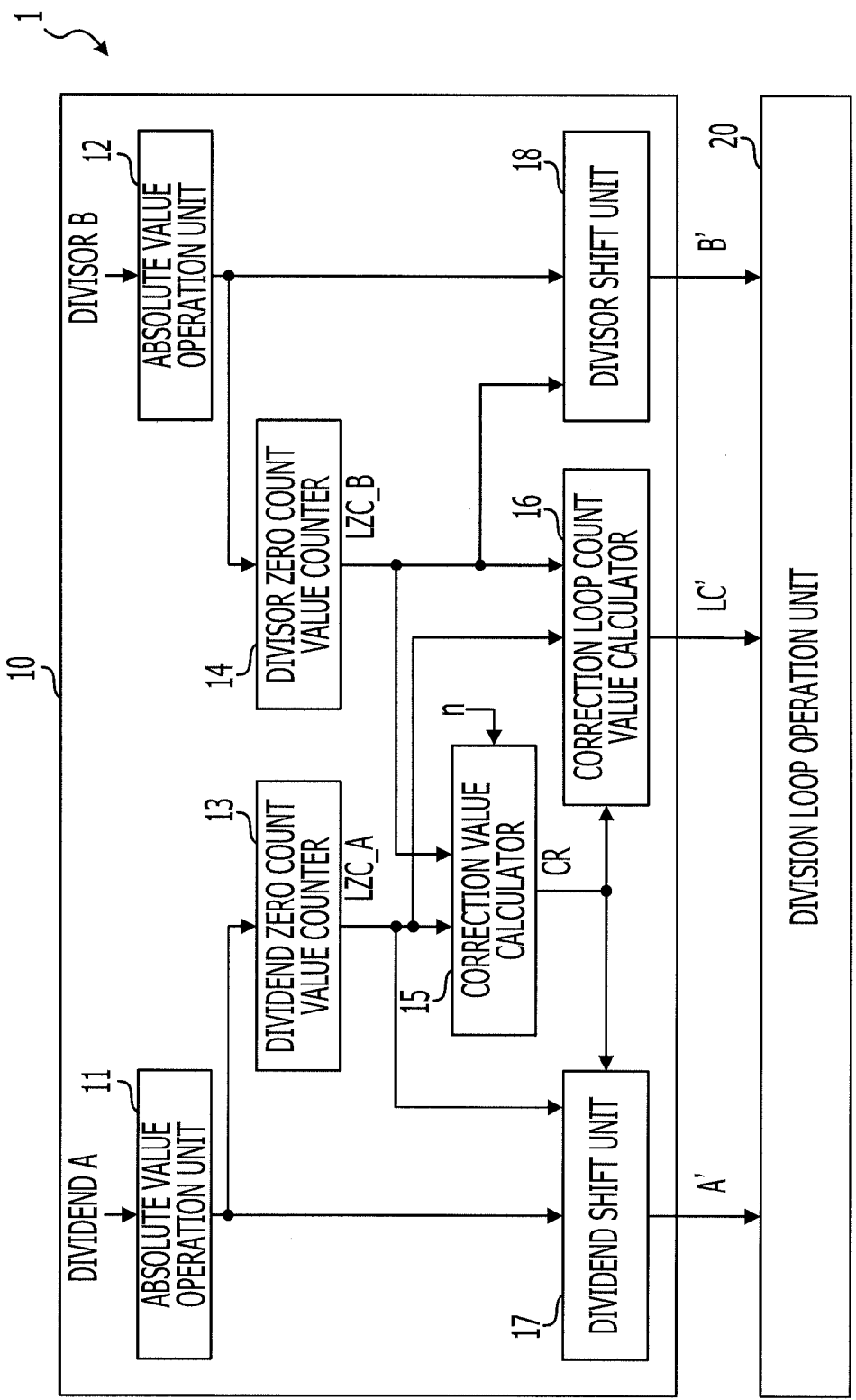
FIG. 1 illustrates a structure of a processor according to an embodiment.

Reference will now be made in detail to the embodiments, examples of which are illustrated in the accompanying drawings, wherein like reference numerals refer to the like elements throughout. The embodiments are described below in detail with reference to the drawings.

FIG. 1 illustrates a structure of a processor 1 of an embodiment.

The processor 1 of FIG. 1 receives a dividend and a divisor, and performs a division operation to divide the dividend by the divisor. In particular, the processor 1 performs the division operation by calculating repeatedly a partial quotient of an n-bit width (n is an integer of 1 or larger). The processor 1 has a pre-operation unit 10 and a division loop operation unit 20 to perform the division operation.

The processor 1 may be implemented as a central processing unit (CPU). In this case, the function of each of the pre-operation unit 10 and the division loop operation unit 20 may be implemented as a arithmetic logical circuit in the CPU. Alternatively, the function of each of the pre-operation unit 10 and the division loop operation unit 20 may be implemented by using software. In such case, the function of each of the pre-operation unit 10 and the division loop operation unit 20 may be implemented in the CPU in an information processing apparatus that executes a specific program.

The pre-operation unit 10 performs a pre-operation for a process of the division loop operation unit 20, including adjusting the dividend and the divisor, and calculating a value used in the process of the division loop operation unit 20. To perform the pre-operation, the pre-operation unit 10 includes absolute value operation units 11 and 12, a dividend zero count value counter 13, a divisor zero count value counter 14, a correction value calculator 15, a correction loop count value calculator 16, a dividend shift unit 17, and a divisor shift unit 18.

The absolute value operation units 11 and 12 respectively convert an input dividend A and an input divisor B into absolute values. In an embodiment, if it is certain that the input dividend A and divisor B are both positive values, the absolute value operation units 11 and 12 are not necessary.

The dividend zero count value counter 13 counts a number of 0s continued from a most significant bit of an output value from the absolute value operation unit 11. The number of counted 0s is referred to as a "zero count value LZC_A". The divisor zero count value counter 14 counts a number of 0s continued from a most significant bit of an output value from the absolute value operation unit 12. The number of counted 0s is referred to as a "zero count value LZC_B".

The correction value calculator 15 calculates a correction value CR to correct a loop count value LC, based on the zero count values LZC_A and LZC_B, and the value n. The loop count value LC indicates a bit width of the final quotient, and is determined in accordance with the above-describe equation (1). The correction value CR is calculated in accordance with the following equation (2):

$$CR = n - (LZC\_B - LZC\_A)\%n - 1 \qquad (2)$$

The correction loop count value calculator 16 calculates a correction loop count value LC' based on the calculated zero count values LZC_A and LZC_B and the correction value CR from the correction value calculator 15. The correction loop count value LC' is calculated in accordance with the following equation (3):

$$LC' = LC + CR = LZC\_B - LZC\_A + \{n - (LZC\_B - LZC\_A)\%n\} \qquad (3)$$

The dividend shift unit 17 shifts the output value from the absolute value operation unit 11 based on the zero count value LZC_A and the correction value CR of the dividend. For example, the dividend shift unit 17 shifts leftward the output value from the absolute value operation unit 11 by the zero count value LZC_A and then shifts rightward the leftward-shifted value by the correction value CR. The order of the left shift and the right shift in the process may be reversed. Alternatively, the dividend shift unit 17 may shift leftward the output value from the absolute value operation unit 11 by (LZC_A-CR).

The divisor shift unit 18 shifts the output value from the absolute value operation unit 12 in accordance with the zero count value LZC_B of the divisor. More specifically, the divisor shift unit 18 shifts leftward the output value from the absolute value operation unit 12 by the zero count value LZC_B.

Through the above process, output values from the dividend shift unit 17 and the divisor shift unit 18 are input to the division loop operation unit 20 as the adjusted dividend and divisor. The dividend and the divisor to be input to the division loop operation unit 20 are respectively referred to as a "dividend A'" and a "divisor B'". The correction loop count value LC' calculated by the correction loop count value calculator 16 is also input to the division loop operation unit 20.

The division loop operation unit 20 divides the dividend A' by the divisor B'. The division loop operation unit 20 calculates the quotient and the remainder by repeating a process of calculating a partial quotient having an n-bit width by the number of times responsive to the correction loop count value LC'. The process to calculate the partial quotient having the n-bit width is referred to as an "n-bit partial quotient calculation operation". The division operation may be one of the recovery division method, the non-recovery division method, and the SRT division. In the n-bit partial quotient calculation operation, the comparison operation using the divisor B' is preferably performed by n times in series.

The process of the pre-operation unit 10 is compared with the related-art pre-operation. In the related-art pre-operation, the absolute value of the dividend is shifted leftward by the zero count value LZC_A, and the resulting dividend is then subjected as an adjusted dividend to the division loop operation. The absolute value of the divisor is shifted by the zero count value LZC_B and the adjusted divisor is then subjected to the division loop operation. The number of repetition of n-bit partial quotient calculation operations in the division loop operation is determined based on the loop count value LC.

In the division loop operation, the n-bit partial quotient calculation operation is repeated. Each time the n-bit partial quotient calculation operation is preformed, n is subtracted from the loop count value LC. If the loop count value LC falls down to zero or below, the loop operation ends. For example, if the recovery division method is applied, the divisor is subtracted from the dividend in a first n-bit partial quotient calculation operation, a partial quotient of n bits is determined from the subtraction results, and an interim remainder is calculated. Furthermore, n is subtracted from the loop count value LC. At second and subsequent n-bit partial quotient calculation operations, the divisor is subtracted from the interim remainder leftward shifted by the n bits, a partial quotient of n bits is determined from the subtraction results, and an interim remainder is calculated. Furthermore, n is subtracted from the loop count value LC.

Figure 26:
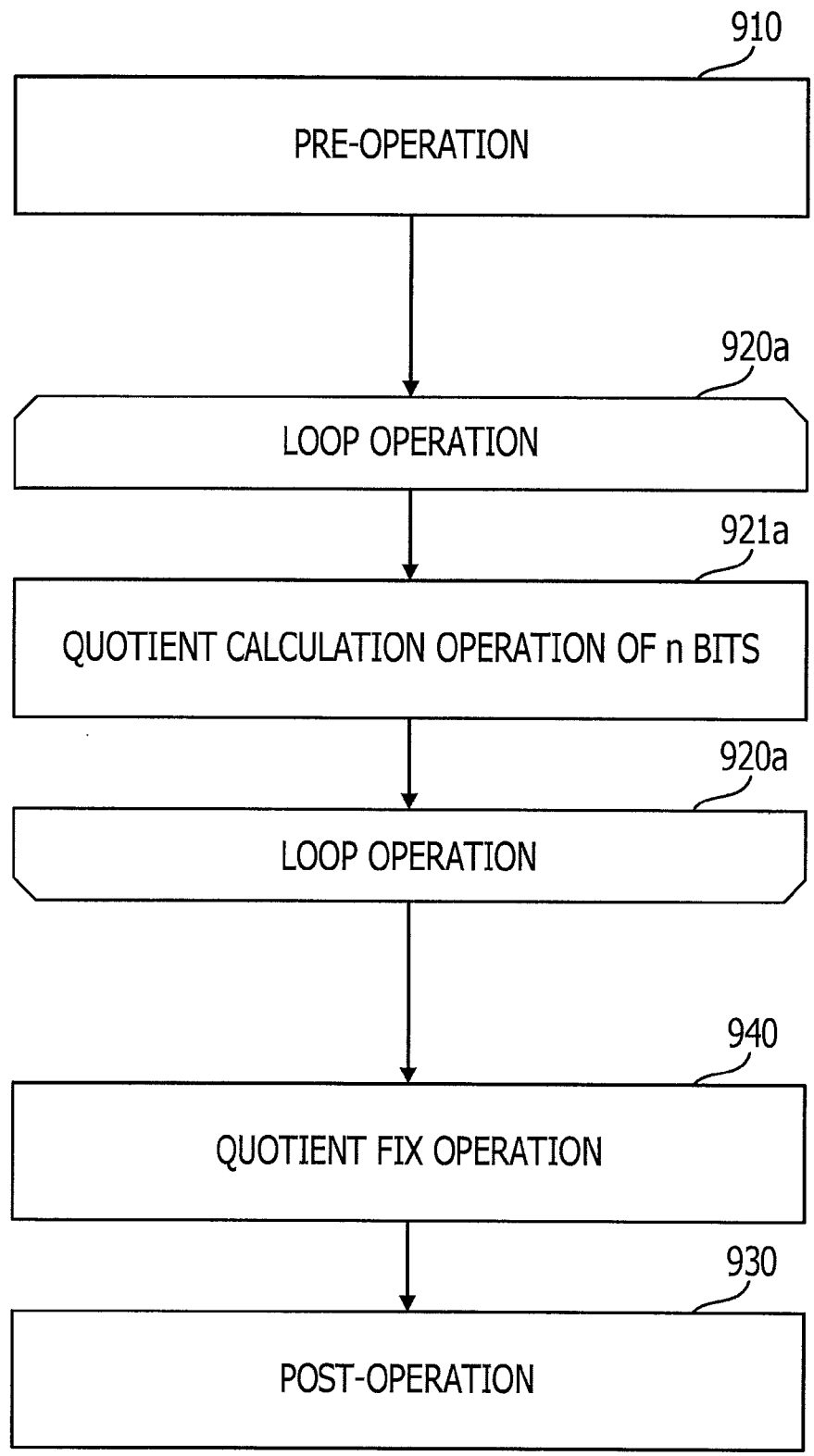
FIG. 26 illustrates a first process example applicable if an initial value of a loop count value is not a multiple of n.
Figure 27:
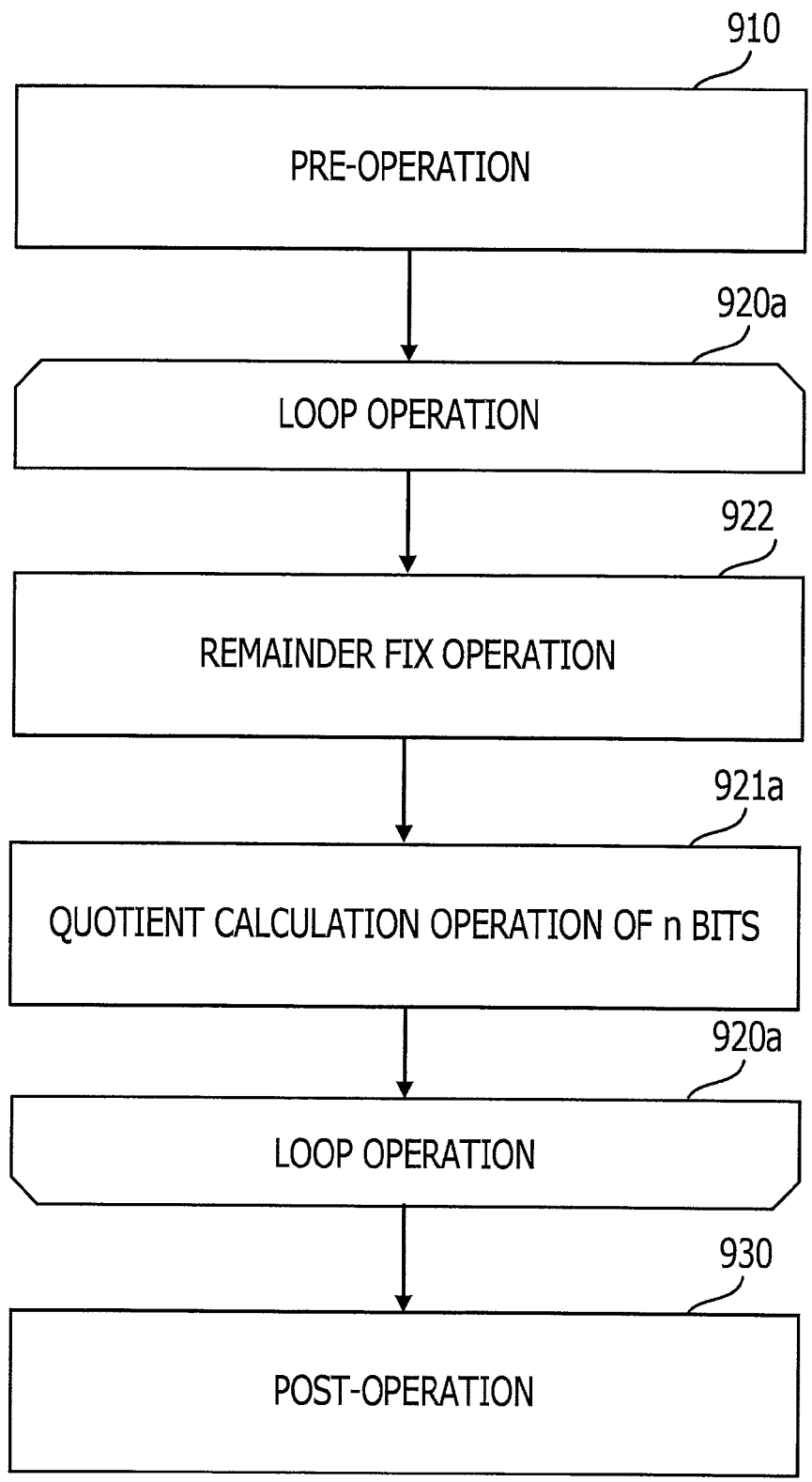
FIG. 27 illustrates a second process example applicable if an initial value of a loop count value is not a multiple of n.

If the loop count value LC is a multiple of n, the loop count value LC becomes zero at the end of a specific n-bit partial quotient calculation operation. A correct final quotient is output based on the partial quotient at this point. If the loop count value LC is not a multiple of n, the loop count value LC fails to become zero or below at the end of a specific n-bit partial quotient calculation operation. In such a case, the bit width of the final quotient fails to match the loop count value LC, and no correct final quotient is output. In order to output a correct quotient, the quotient fix operation 940 of FIG. 26 or the remainder fix operation 922 of FIG. 27 is used.

In contrast, the correction loop count value calculator 16 in the pre-operation unit 10 of an embodiment uses the correction value CR to correct the loop count value LC to a multiple of n. More specifically, whatever value each of the dividend A and the divisor B takes, the correction loop count value LC' output from the correction loop count value calculator 16 becomes a multiple of n.

The division loop operation unit 20 receives the correction loop count value LC' in place of the loop count value LC of related art, and repeats the n-bit partial quotient calculation operation. Each time the n-bit partial quotient calculation operation is repeated, the division loop operation unit 20 subtracts n from the correction loop count value LC'. In this way, the correction loop count value LC' becomes zero at the end of a specific n-bit partial quotient calculation operation.

In accordance with equation (2), the correction value CR becomes 0 if the loop count value LC of related art based on the dividend A and the divisor B is a multiple of n. However, if the loop count value LC of related art based on the dividend A and the divisor B is not a multiple of n, the correction value CR becomes 1 or more.

If the correction value CR is 1 or more, the correction loop count value LC' becomes higher than the loop count value LC of related art. The number of repetitions of add and subtract operation and comparison operation to obtain a partial quotient of 1 bit increases in the whole division loop operation. Since the bit width of the partial quotient is large, the bit width of the final quotient becomes large, and no correct final quotient is obtained. The dividend shift unit 17 in the pre-operation unit 10 corrects the dividend A in accordance with the correction value CR, thereby outputting a correct final quotient.

The partial quotient obtained through the n-bit partial quotient calculation operation of the loop operation is determined based on a size relation between one of the dividend and the interim remainder and the divisor. For example, the radix in the calculation of one n-bit partial quotient calculation operation may be $2^j$. A resulting partial quotient is 0 in the division operation based on the recovery division method with j=1 if one of the dividend and the interim remainder as a target of subtraction is smaller than the divisor. One of the original dividend and the interim remainder is shifted leftward by 1 bit, and the leftward-shifted value is subjected to a next subtract operation.

The dividend to be input to the subtraction loop in the pre-operation is shifted rightward by the correction value CR such that a partial quotient of a portion increased by the correction of the loop count value LC is nullified to 0. More specifically, the partial quotient corresponding to the correction value CR from the most significant bit of the final quotient is nullified to 0, and a process operation related to the calculation of the partial quotient is thus skipped.

The dividend shift unit 17 in the pre-operation unit 10 performs a correction operation to shift rightward the dividend by the correction value CR before inputting the dividend to the division loop operation unit 20. Through the correction operation, the division loop operation unit 20 calculates a correct final quotient even if the loop count value LC of related art based on the dividend A and the divisor B is not a multiple of n.

The dividend shift unit 17 can cause a shift-out in a lower bit in the correction operation of the correction value CR (for example, a right-shift operation by the correction value CR). To avoid such a shift-out, the dividend A subsequent to the absolute value process is set to satisfy a condition of LZC_A≥n−1. To permit a dividend A not satisfying such a condition, a zero extender may be arranged in the pre-operation unit 10. The zero extender extends in an upper bit direction the bit width of the absolute dividend A from the absolute value operation unit 11, and sets 0s in the extended upper bits. The zero extender to extend the dividend A in the upper bit direction by (n−1) bits allows the division operation to be executed correctly regardless of the value of the dividend A. If the bit width of the dividend A is to be extended, a zero extender is also arranged to extend in the upper bit direction by the same number of bits the bit width of the absolute divisor B and to set 0s on the extended bits. Thus, the division operation is performed correctly.

In accordance with an embodiment, the division operation is correctly performed even if the dividend A and the divisor B with the loop count value LC of related art failing to be a multiple of n are input. The advantage may be obtained if the pre-operation unit 10 corrects the loop count value LC and the dividend based on the correction value CR. The correction of the loop count value LC and the dividend eliminates the need for adding a process operation subsequent to the division loop operation or the need for modifying the procedure of the division loop operation. A design modification to a divider circuit for the process subsequent to the division loop operation becomes unnecessary. This arrangement also controls an increase in power consumption and latency time caused by the process subsequent to the division loop operation.

To increase the effectiveness of the above advantage, the pre-operation unit 10 determines the correction value CR and the correction loop count value LC' through simplified calculations represented by equations (2) and (3). In accordance with equations (2) and (3), the zero count values LZC_A and LZC_B, used in related art, are also calculated. The correction of the dividend may be also performed by adjusting an amount of shift. The number of process operations added to the related-art pre-operation is reduced. This arrangement controls an increase in the size of the divider circuit for the process, the power consumption in the process, and the latency time of the divider circuit.

Figure 2:
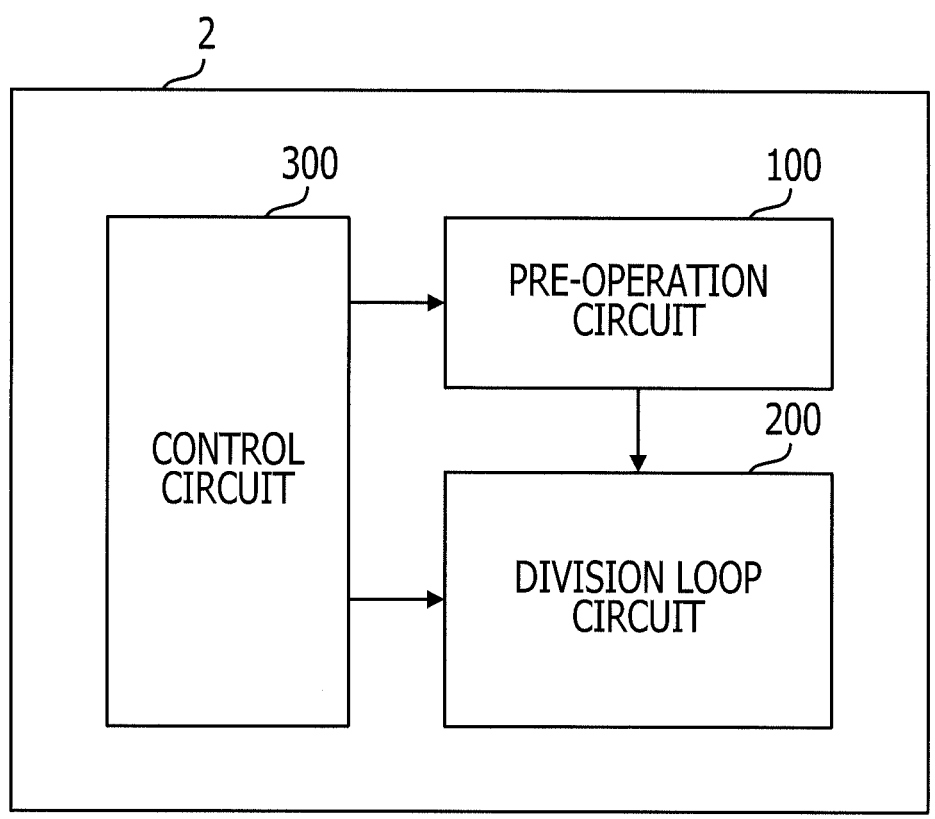
FIG. 2 illustrates a structure of a divider circuit according to an embodiment.

FIG. 2 illustrates a structure of a divider circuit 2 in accordance with an embodiment. The divider circuit 2 of FIG. 2 includes a pre-operation circuit 100, a division loop circuit 200, and a control circuit 300. The pre-operation circuit 100 and the division loop circuit 200 are respectively hardware circuit versions of the pre-operation unit 10 and the division loop operation unit 20 illustrated in FIG. 1. More specifically, the pre-operation circuit 100 performs a pre-operation prior to a process of the division loop circuit 200. The division loop circuit 200 executes the division operation by calculating repeatedly a partial quotient of an n-bit width. The control circuit 300 controls operation timings of the pre-operation circuit 100 and the division loop circuit 200. The control circuit 300 outputs a variety of control signals to control the operation of each of internal circuits in the pre-operation circuit 100 and the division loop circuit 200.

The divider circuit 2 may further include a post-operation circuit (not illustrated) to output a final quotient and a remainder based on calculation results of the division loop circuit 200. The post-operation circuit may be arranged within the divider circuit 2 if necessary depending on the internal structure of the division loop circuit 200.

Figure 3:
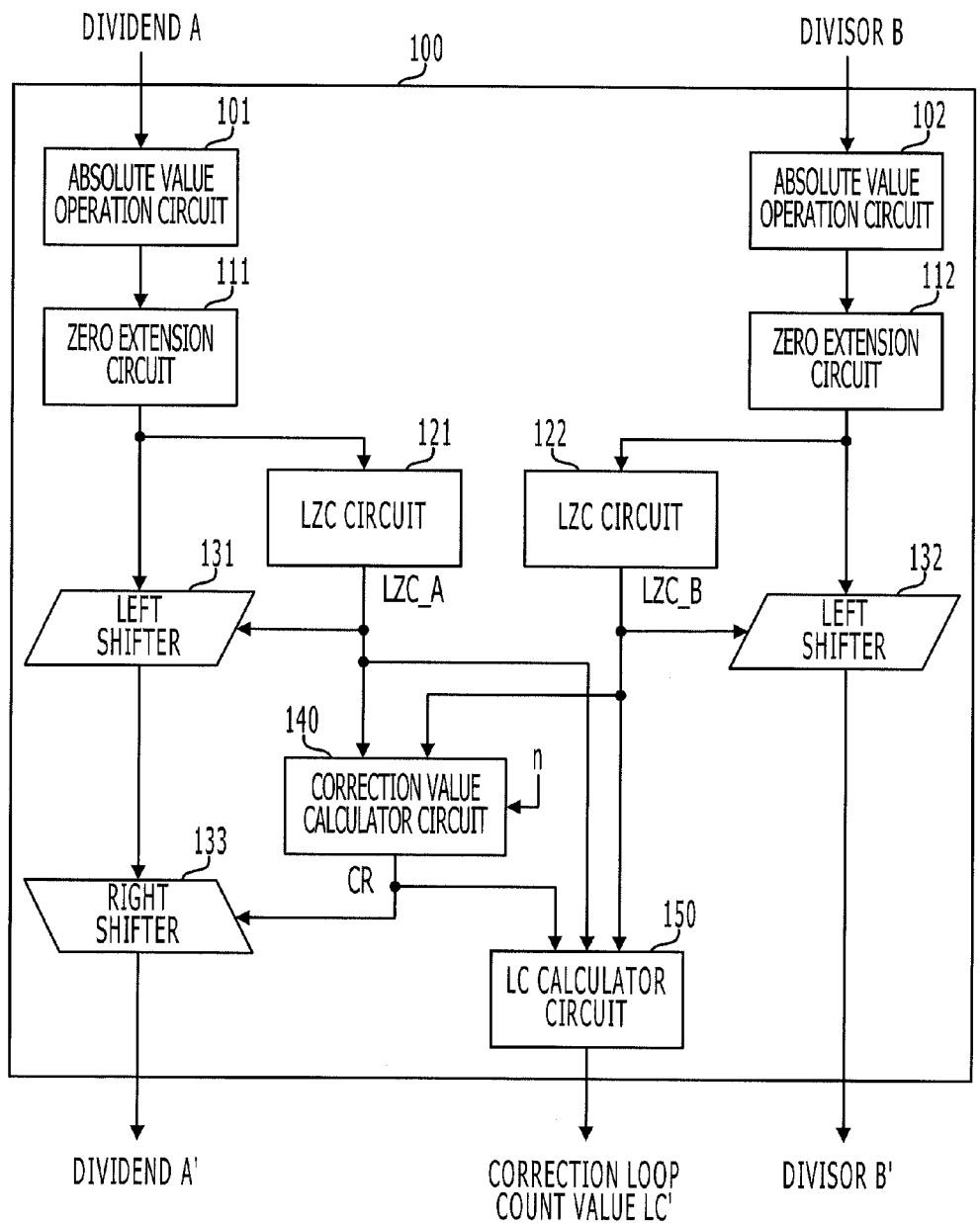
FIG. 3 illustrates an internal structure of a pre-operation circuit according to an embodiment.

FIG. 3 illustrates an internal structure of the pre-operation circuit 100 of an embodiment.

The pre-operation circuit 100 includes absolute value operation circuits 101 and 102, zero extension circuits 111 and 112, leading-zero count (LZC) circuits 121 and 122, left shifters 131 and 132, a right shifter 133, a correction value calculator circuit 140, and a loop count (LC) calculator circuit 150.

The absolute value operation circuit 101 outputs the absolute value of an input dividend A. The absolute value operation circuit 102 outputs the absolute value of an input divisor B.

The zero extension circuit 111 extends the bit width of the dividend A as the absolute value in the upper bit direction by (n−1) bits and sets 0s to the extended bits. The zero extension circuit 112 extends the bit width of the divisor B as the absolute value in the upper bit direction by (n−1) bits and sets 0s to the extended bits.

The LZC circuit 121 counts the number of 0s continued from the most significant bit of an output value from the zero extension circuit 111, and outputs a zero count value LZC_A. The LZC circuit 122 counts the number of 0s continued from the most significant bit of an output value from the zero extension circuit 112 and outputs a zero count value LZC_B.

The left shifter 131 shifts leftward the output value from the zero extension circuit 111 by the zero count value LZC_A output by the LZC circuit 121. The left shifter 132 shifts leftward the output value from the zero extension circuit 112 by the zero count value LZC_B output by the LZC circuit 122 and outputs the leftward-shifted output value as the divisor B' to the division loop circuit 200.

The correction value calculator circuit 140 calculates the correction value CR in accordance with the previously discussed equation (2) based on the zero count values LZC_A and LZC_B output by the LZC circuits 121 and 122, and the value of n set beforehand.

The LC calculator circuit 150 calculates the correction loop count value LC' in accordance with the previously discussed equation (3) based on the zero count values LZC_A and LZC_B output by the LZC circuits 121 and 122, and the correction value CR output by the correction value calculator circuit 140. The calculation results are output to the division loop circuit 200.

The right shifter 133 shifts rightward an output value from the left shifter 131 by the correction value CR output by the correction value calculator circuit 140, and outputs the rightward-shifted value as the dividend A' to the division loop circuit 200.

Figure 4:
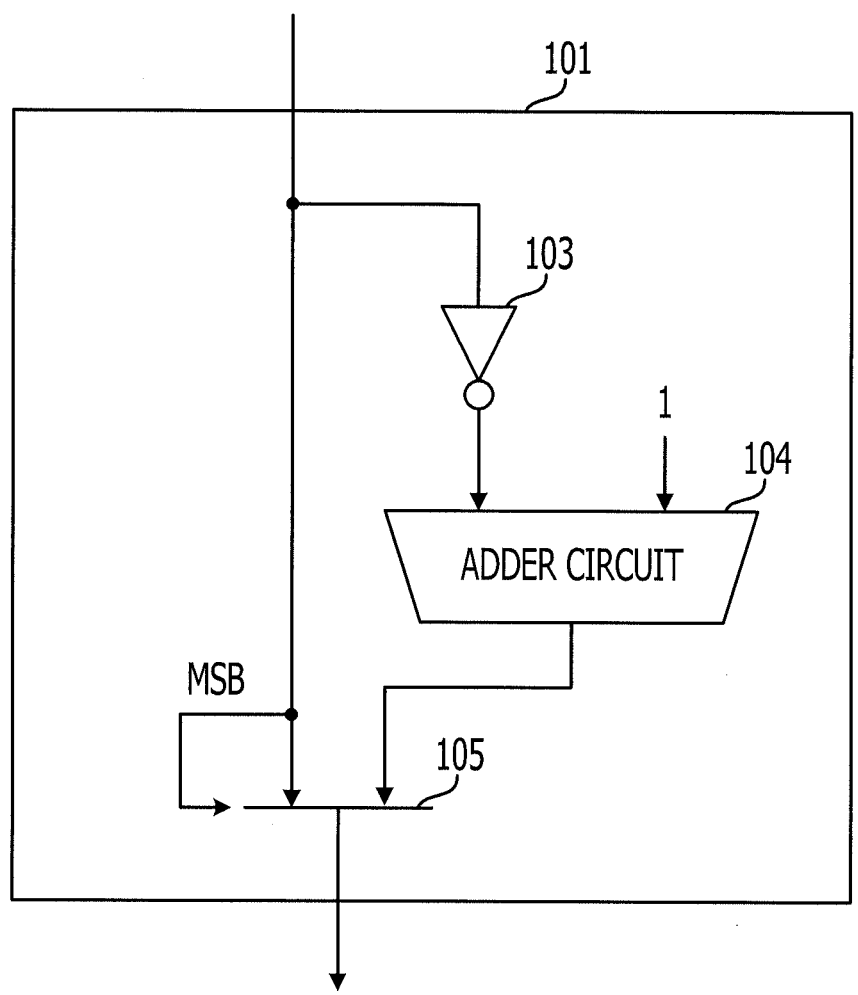
FIG. 4 illustrates an internal structure of an absolute value operation circuit.

FIG. 4 illustrates an internal structure of the absolute value operation circuit 101. The absolute value operation circuit 101 is identical in structure to the absolute value operation circuit 102. Therefore, the structure of only the absolute value operation circuit 101 is discussed herein.

The absolute value operation circuit 101 includes an inverter 103, an adder circuit 104, and a selector 105. The inverter 103 inverts the value of each bit of the output value of the zero extension circuit 111. The adder circuit 104 adds 1 to an output value of the inverter 103.

The selector 105 outputs one of the input value and the output value of the adder circuit 104 in response to the value of the most significant bit of the input value. More specifically, the selector 105 selects and outputs the input value if the most significant bit of the input value is 0, and selects and outputs the output value of the adder circuit 104 if the most significant bit is 1.

Figure 5:
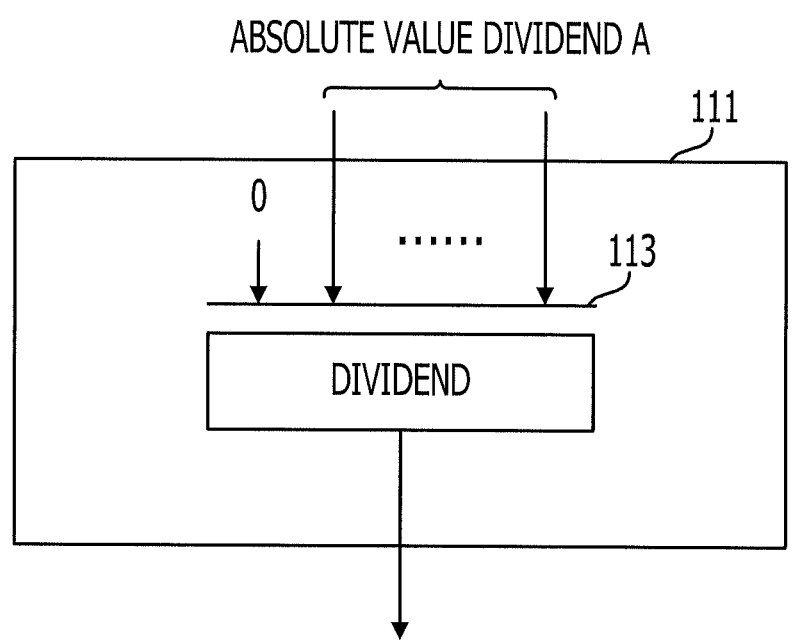
FIG. 5 illustrates an internal structure of a zero extension circuit.

FIG. 5 illustrates an internal structure of the zero extension circuit 111. The zero extension circuit 111 is identical in structure to the zero extension circuit 112. The structure of only the zero extension circuit 111 is discussed here.

The zero extension circuit 111 includes a latch circuit 113. The latch circuit 113 holds data having a bit width larger than the number of bits of the dividend A input from the absolute value operation circuit 101 by (n−1) bits. The latch circuit 113 receives the absolute value dividend A as the lower bits while also receiving 0s as the upper (n−1) bits, and holds these bits. The latch timing of the latch circuit 113 may be controlled by a timing control signal (not illustrated) from the control circuit 300.

The value of n is set beforehand by the control circuit 300 in accordance with the specifications of the connected division loop circuit 200. For example, if n=2, 0s are received as the upper bits and the dividend A is extended in the upper bit direction by 1 bit as illustrated in FIG. 5. For example, if the dividend A is "1000 0111", the value held by the latch circuit 113 becomes "0 1000 0111".

Figure 6:
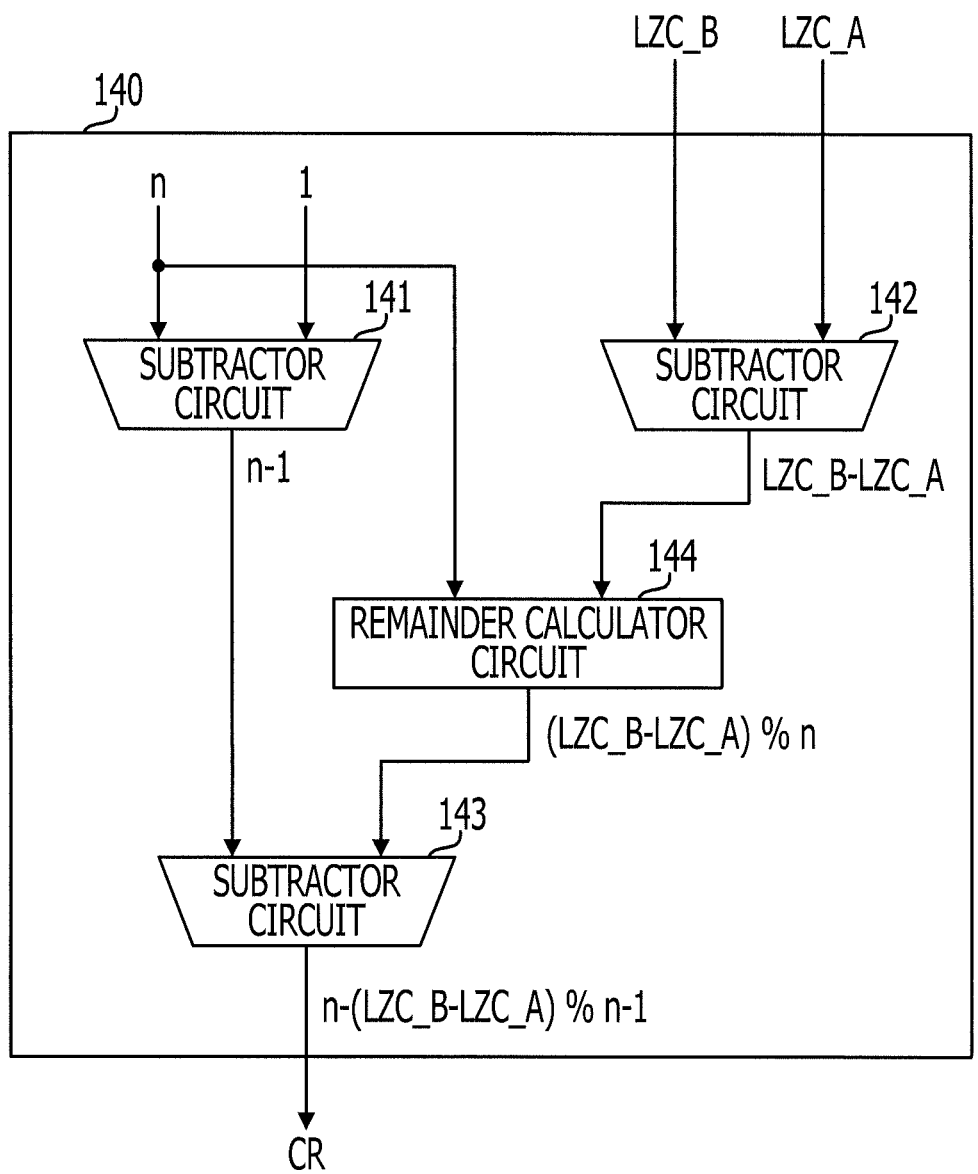
FIG. 6 illustrates an internal structure of a correction value calculator circuit.

FIG. 6 illustrates an internal structure of the correction value calculator circuit 140.

The correction value calculator circuit 140 includes subtractor circuits 141 to 143 and a remainder calculator circuit 144. The subtractor circuit 141 subtracts 1 from the value n. The value of n is preset in accordance with the specifications of the connected division loop circuit 200. The subtractor circuit 142 subtracts the zero count value LZC_A output by the LZC circuit 121 from the zero count value LZC_B output by the LZC circuit 122.

The remainder calculator circuit 144 divides an output value of the subtractor circuit 142 by the value of n, and then outputs the remainder. The subtractor circuit 143 subtracts the output value of the remainder calculator circuit 144 from the output value of the subtractor circuit 141. As a result, the subtractor circuit 143 outputs the correction value CR calculated in accordance with equation (2).

Figure 7:
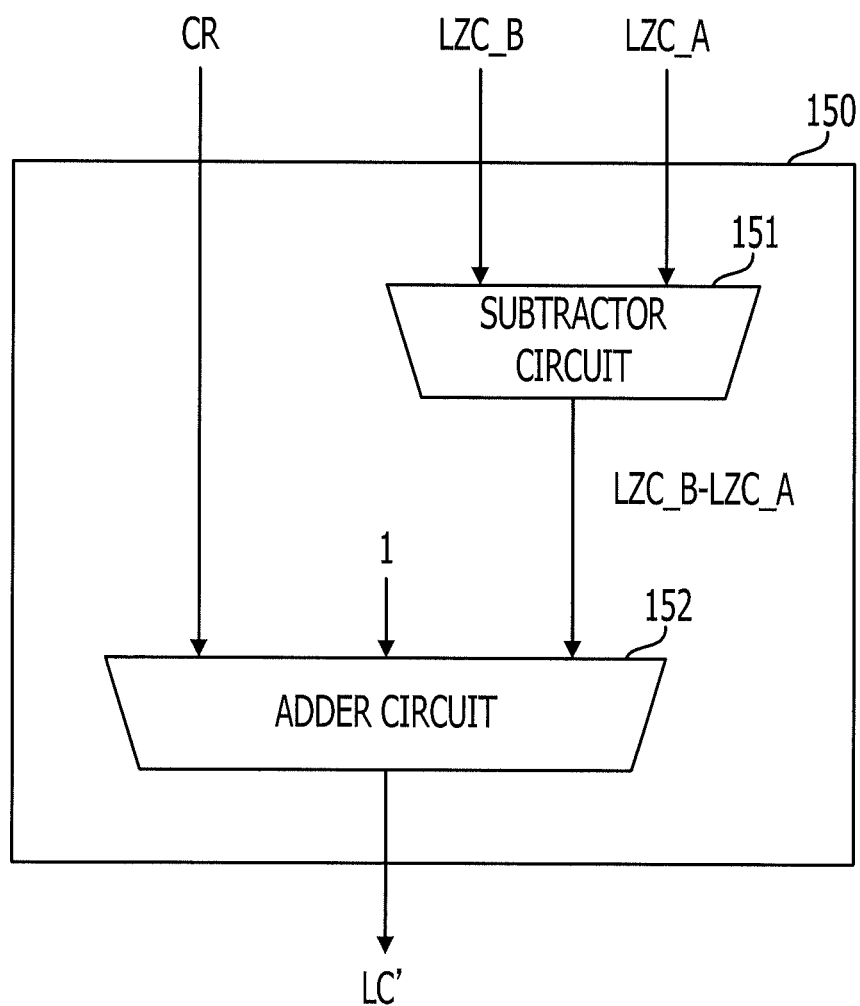
FIG. 7 illustrates an internal structure of an LC calculator circuit.

FIG. 7 illustrates an internal structure of the LC calculator circuit 150.

The LC calculator circuit 150 includes a subtractor circuit 151 and an adder circuit 152. The subtractor circuit 151 subtracts the zero count value LZC_A output by the LZC circuit 121 from the zero count value LZC_B output by the LZC circuit 122. The subtractor circuit 151 and the subtractor circuit 142 in the correction value calculator circuit 140 may be integrated into one common subtractor circuit. The adder circuit 152 sums the correction value CR output by the correction value calculator circuit 140, the output value output by the subtractor circuit 151, and 1. As a result, the adder circuit 152 outputs the correction loop count value LC' calculated in accordance with equation (3).

Figure 8:
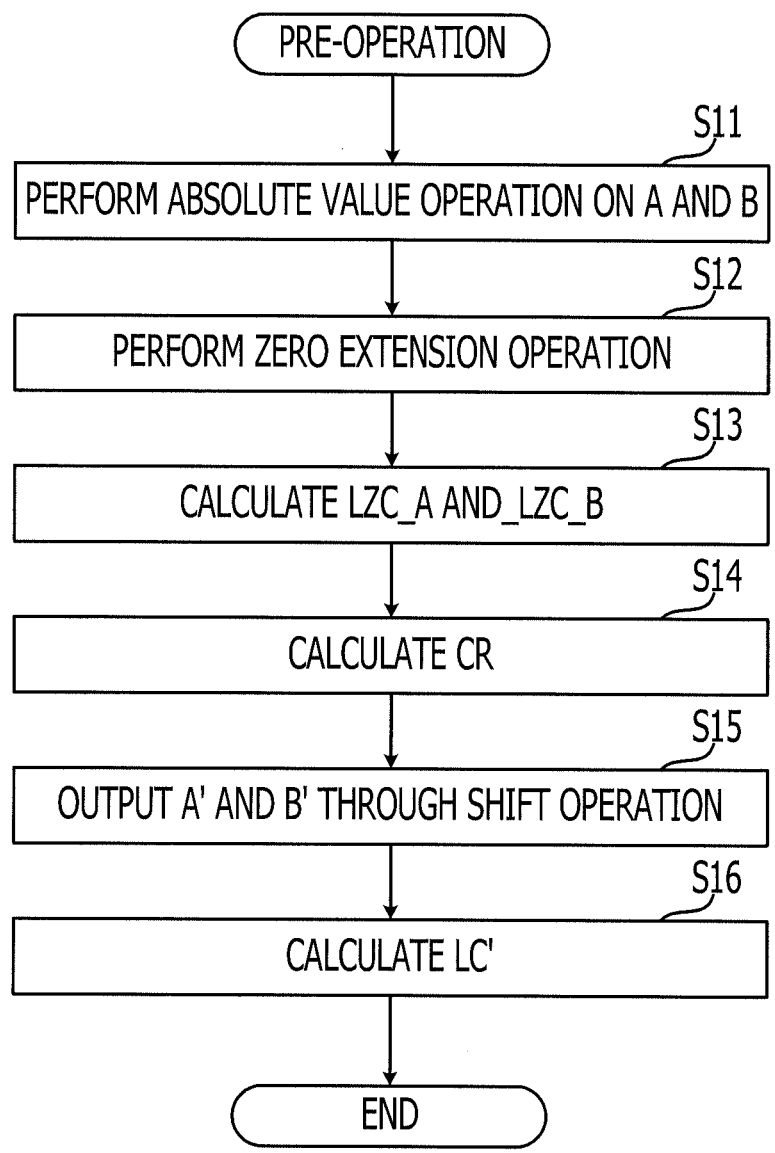
FIG. 8 is a flowchart illustrating a pre-operation of the pre-operation circuit.

FIG. 8 is a flowchart illustrating the pre-operation of the pre-operation circuit 100.

At operation S11, the absolute value operation circuit 101 performs an absolute value operation on the input dividend A. The absolute value operation circuit 102 performs an absolute value operation on the divisor B.

At operation S12, the zero extension circuit 111 receives into the internal latch circuit 113 thereof the absolute dividend A from the absolute value operation circuit 101, in response to a timing control signal from the control circuit 300. The zero extension circuit 112 receives into an internal latch circuit thereof the absolute divisor B from the absolute value operation circuit 102, in response to a timing control signal from the control circuit 300.

At operation S13, the LZC circuit 121 counts the number of 0s continued from the most significant bit of the output value of the zero extension circuit 111, and then outputs the zero count value LZC_A. The LZC circuit 122 counts the number of 0s continued from the most significant bit of the output value of the zero extension circuit 112 and outputs the zero count value LZC_B.

At operation S14, the correction value calculator circuit 140 calculates the correction value CR in accordance with equation (2) in response to the zero count values LZC_A and LZC_B respectively output by the LZC circuits 121 and 122, and the preset value of n.

At operation S15, the left shifter 131 shifts leftward the output value of the absolute value operation circuit 101 by the zero count value LZC_A output by the LZC circuit 121. The right shifter 133 shifts rightward the output value of the left shifter 131 by the correction value CR output by the correction value calculator circuit 140, and then outputs the rightward-shifted value as the dividend A' to the division loop circuit 200. The left shifter 132 shifts leftward the output value of the absolute value operation circuit 102 by the zero count value LZC_B output by the LZC circuit 122, and then outputs the leftward-shifted value as the divisor B' to the division loop circuit 200.

The left shifters 131 and 132 may execute the shift operations thereof prior to the calculation of the correction value CR.

At operation S16, the LC calculator circuit 150 calculates the correction loop count value LC' in accordance with equation (3) on the basis of the zero count values LZC_A and LZC_B respectively output by the LZC circuits 121 and 122 and the correction value CR output by the correction value calculator circuit 140. The calculation results are output to the division loop circuit 200.

The process order of operations S15 and S16 may be reversed.

Figure 9:
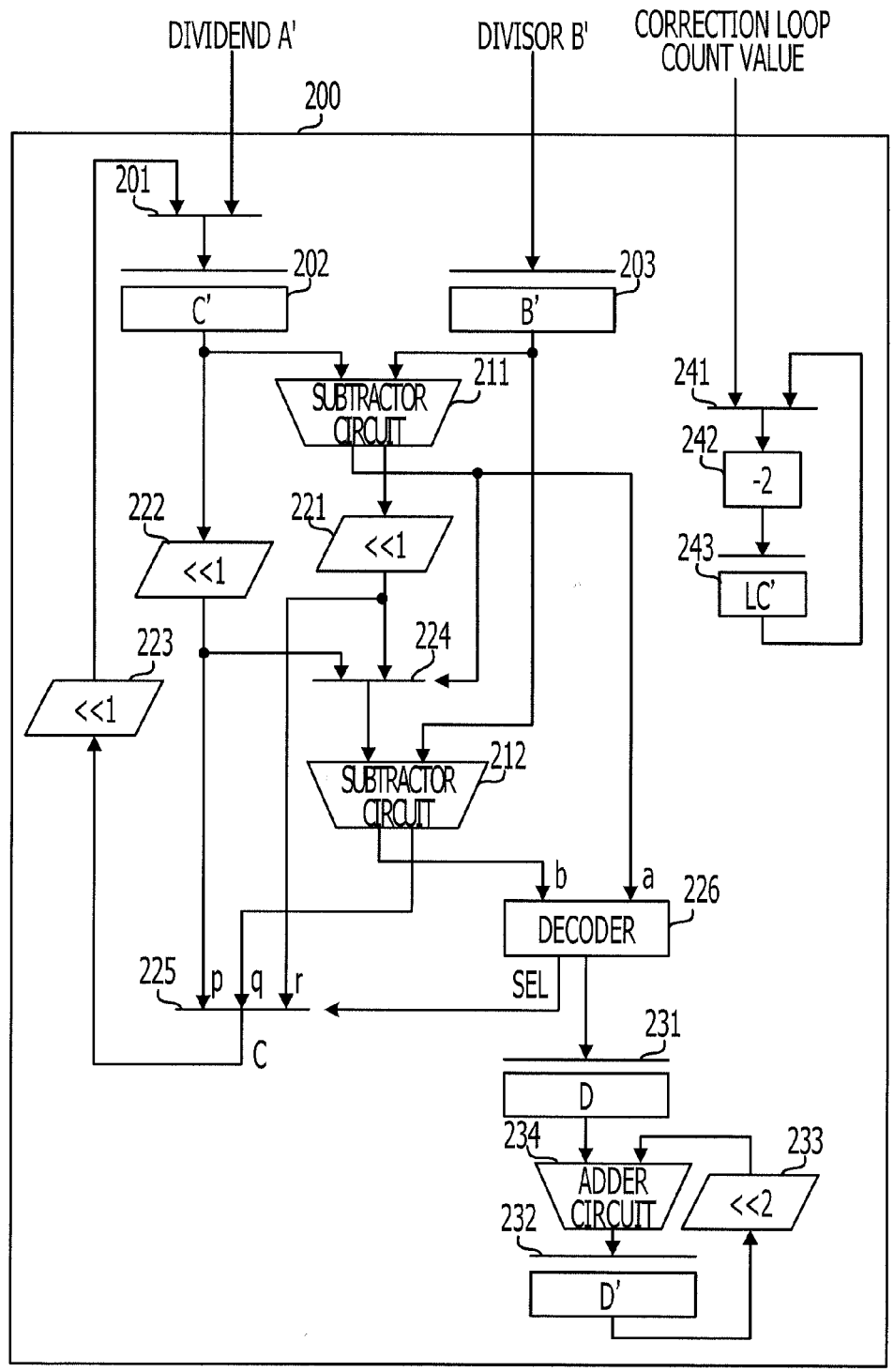
FIG. 9 illustrates an internal structure of a division loop circuit.

FIG. 9 illustrates an internal structure of the division loop circuit 200. Referring to FIG. 9, a Radix-4 division operation with n=2, j=1, and k=2 is performed by using the recovery division method. The structure of the division loop circuit 200 in FIG. 9 is illustrated for exemplary purposes only. Another circuit structure performing the Radix-4 division operation with n=2, j=1, and k=2 may be used.

The division loop circuit 200 illustrated in FIG. 9 includes a selector 201, latch circuits 202 and 203, subtractor circuits 211 and 212, left shifters 221 to 223, selectors 224 and 225, a decoder 226, latch circuits 231 and 232, a left shifter 233, an adder circuit 234, a selector 241, a subtractor circuit 242, and a latch circuit 243.

The selector 201 selectively outputs one of the dividend A' output by the pre-operation circuit 100 and an output value of the left shifter 223. The latch circuit 202 holds an output value from the selector 201. The value to be held by the latch circuit 202 is referred to as an "interim remainder initial value C'". The latch circuit 203 holds the divisor B' output by the pre-operation circuit 100.

The subtractor circuit 211 subtracts the divisor B' held by the latch circuit 203 from the interim remainder initial value C' held by the latch circuit 202. The subtraction results of the subtractor circuit 211 are output to the left shifter 221. A carry-out from the subtractor circuit 211 is supplied to the decoder 226 while also being output to the selector 224 as a select signal.

The left shifter 221 shifts leftward the subtraction results of the subtractor circuit 211 by 1 bit. The left shifter 222 shift leftward the interim remainder initial value C' held by the latch circuit 202 by 1 bit.

The selector 224 selects and outputs one of an output value of the left shifter 221 and an output value of the left shifter 222 in response to the carry-out from the subtractor circuit 211. The subtractor circuit 212 subtracts the divisor B' held by the latch circuit 203 from the output value of the selector 224. The subtraction results of the subtractor circuit 212 are output to the selector 225, and a carry-out from the subtractor circuit 212 is output to the decoder 226.

The selector 225 selects and outputs one of the output value of the left shifter 222, the carry-out from the subtractor circuit 212, and the output value of the left shifter 221 in response to a select signal SEL from the decoder 226. The left shifter 223 shifts leftward the output value of the selector 225 by 2 bits, and outputs the leftward-shifted value to the selector 201.

The decoder 226 outputs a partial quotient D of n (=2) bits in response to a combination of the carry-outs from the subtractor circuits 211 and 212 while outputting the select signal SEL to the selector 225.

The latch circuit 231 holds the partial quotient D output by the decoder 226. The adder circuit 234 adds the partial quotient D held by the latch circuit 231 to an output value of the left shifter 233. The latch circuit 232 holds the addition results of the adder circuit 234. The left shifter 233 shifts leftward the value, held by the latch circuit 232, by n bits, i.e., 2 bits. This arrangement causes the latch circuit 232 to latch an interim quotient D'.

The selector 241 outputs one of the correction loop count value LC' output by the pre-operation circuit 100 and the correction loop count value LC' held by the latch circuit 243 in response to a select signal (not illustrated) output by the control circuit 300. The subtractor circuit 242 subtracts n, i.e., 2 from an output value of the selector 241. The latch circuit 243 holds an output value of the subtractor circuit 242.

Figure 10:
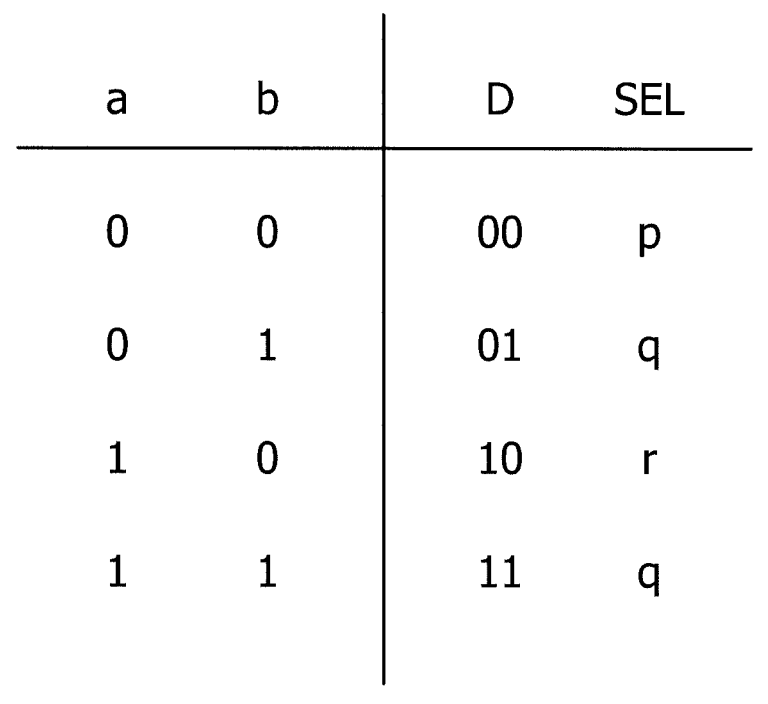

FIG. 10 is a truth table indicating an input-output relationship of the decoder 226 illustrated in FIG. 9. Referring to FIG. 10, "a" and "b" respectively represent carry-outs of the subtractor circuits 211 and 212, and "p", "q", and "r" respectively represent inputs to the selector 225 from the left shifter 222, the subtractor circuit 212, and the left shifter 221.

The decoder 226 outputs a partial quotient D and a select signal SEL in accordance with the truth table of FIG. 10. If the carry-outs "a" and "b" from the subtractor circuits 211 and 212 are 0s, the decoder 226 sets the partial quotient D to be "00", and outputs the select signal SEL to cause the selector 225 to select the output value "p" from the left shifter 222. If the carry-outs "a" and "b" from the subtractor circuits 211 and 212 are 0 and 1, respectively, the decoder 226 sets the partial quotient D to be "01", and outputs the select signal SEL to cause the selector 225 to select the subtraction results "q" from the subtractor circuit 212. If the carry-outs "a" and "b" from the subtractor circuits 211 and 212 are 1 and 0, respectively, the decoder 226 sets the partial quotient D to be "10", and outputs the select signal SEL to cause the selector 225 to select the output value "r" from the left shifter 221. If the carry-outs from the subtractor circuits 211 and 212 are 1s, the decoder 226 sets the partial quotient D to be "11", and outputs the select signal SEL to cause the selector 225 to select the subtraction results "q" from the subtractor circuit 212.

Figure 11:
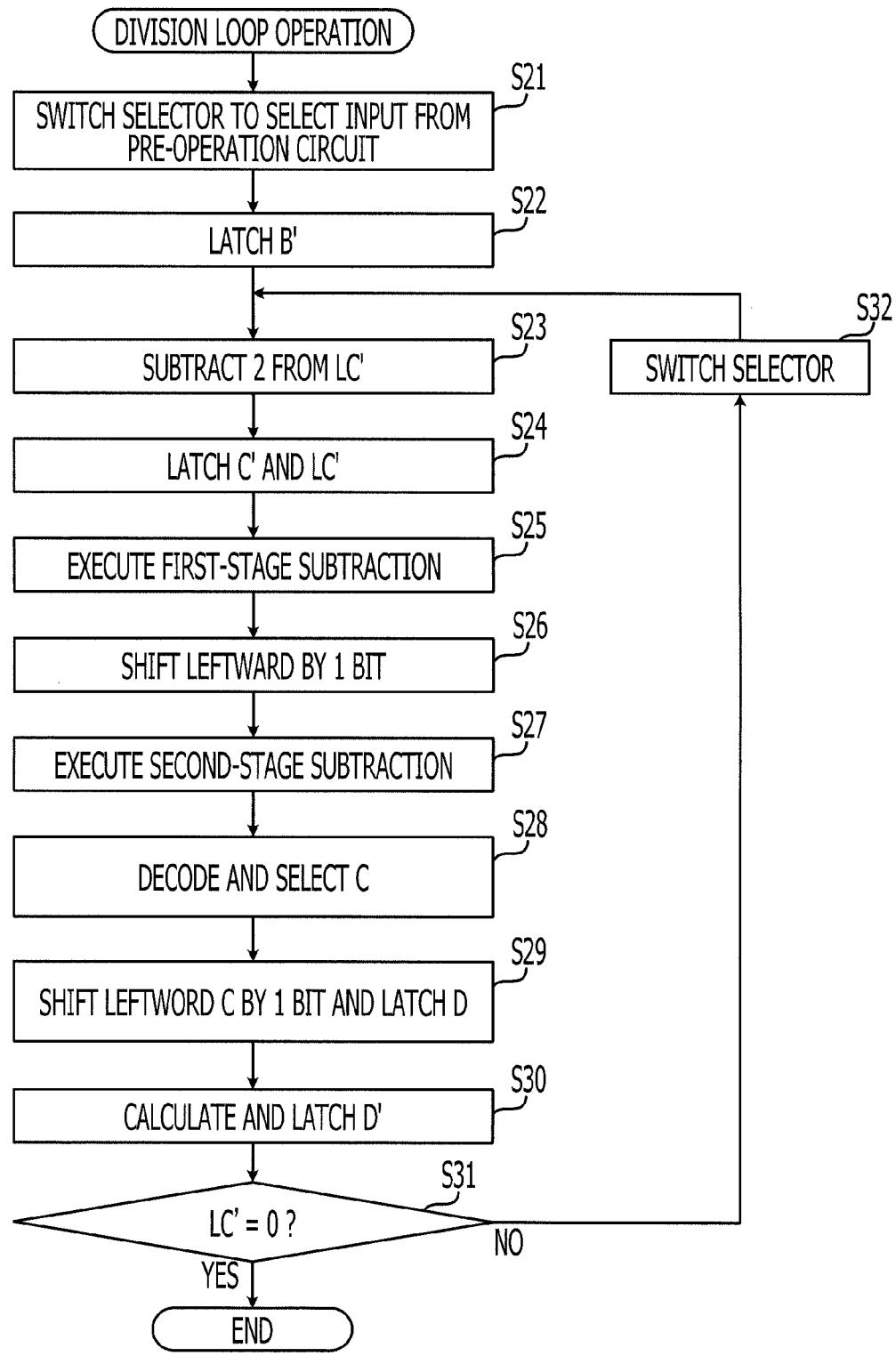
FIG. 11 is a flowchart illustrating a division loop operation of a division loop circuit of FIG. 9.

FIG. 11 is a flowchart illustrating a division loop operation of the division loop circuit 200 of FIG. 9.

At operation S21, in response to a select signal from the control circuit 300, the selector 201 selects the dividend A' output by the pre-operation circuit 100. The selector 241 selects the correction loop count value LC', output by the pre-operation circuit 100, in response to a select signal from the control circuit 300.

At operation S22, the latch circuit 203 holds the divisor B', output by the pre-operation circuit 100, in response to a timing control signal from the control circuit 300.

The process order of operations S21 and S22 may be reversed.

The process of the division loop circuit 200 to be performed in operations S23 to S30 corresponds to one cycle of n-bit partial quotient calculation operation for calculating the partial quotient of the n-bit width.

At operation S23, the subtractor circuit 242 subtracts n, i.e., 2 from the output value output by the selector 241.

At operation S24, the latch circuit 202 holds the output value of the selector 201 in response to a timing control signal from the control circuit 300. The latch circuit 243 holds the output value from the subtractor circuit 242 in response to a timing control signal from the control circuit 300.

At operation S25, the first-stage subtractor circuit 211 subtracts the divisor B', held by the latch circuit 203, from the interim remainder initial value C' held by the latch circuit 202. The carry-out from the subtractor circuit 211 is supplied to the selector 224. The selector 224 selects the output value of the left shifter 222 if the carry-out from the subtractor circuit 211 is 0, and selects the output value from the left shifter 221 if the carry-out from the subtractor circuit 211 is 1.

At operation S26, the left shifter 221 shifts leftward the subtraction results of the subtractor circuit 211 by 1 bit. The left shifter 222 shifts leftward the interim remainder initial value C' held by the latch circuit 202 by 1 bit.

At operation S27, the second-stage subtractor circuit 212 subtracts the divisor B' held by the latch circuit 203 from the output value from the selector 224.

At operation S28, the decoder 226 outputs the partial quotient D and the select signal SEL in response to a combination of the carry-outs from the subtractor circuits 211 and 212. The selector 225 performs a selection operation in response to the select signal SEL, thereby outputting the interim remainder C.

At operation S29, the left shifter 223 shifts leftward the interim remainder C from the selector 225 by 1 bit. The latch circuit 231 holds the partial quotient D from the decoder 226 in response to a timing control signal from the control circuit 300.

At operation S30, the adder circuit 234 adds the partial quotient D held by the latch circuit 231 to the output value of the left shifter 233, and outputs the interim quotient D'. In response to a timing control signal from the control circuit 300, the latch circuit 232 holds the interim quotient D' calculated by the adder circuit 234. The left shifter 233 shifts leftward the interim quotient D', held by the latch circuit 232, by n bits, i.e., 2 bits.

At operation S31, the control circuit 300 determines whether the correction loop count value LC' held by the latch circuit 243 is 0. If the correction loop count value LC' is not 0, operation S32 is performed. If the correction loop count value LC' is 0, the divider circuit 2 ends the process thereof. The interim quotient D' held by the latch circuit 232 becomes the final quotient, and the interim remainder C output by the selector 225 becomes the final remainder.

At operation S32, the selector 201 selects the output from the left shifter 223 in response to a select signal from 300. The selector 241 selects the output from the latch circuit 243 in response to a select signal from the control circuit 300. The process starting with operation S23 is executed again to calculate the partial quotient D having the n-bit width.

The pre-operation circuit 100 in the divider circuit 2 calculates the dividend A', the divisor B', and the correction loop count value LC'. The division loop circuit 200 in the divider circuit 2 described above receives these values, and performs the division loop operation. Through operations S23 to S30, the division loop circuit 200 calculates the partial quotient D of n (=2) bits. The n-bit partial quotient calculation operation is repeated by (LC'/n) times, resulting in the final quotient.

Even if the dividend A and the divisor B with the loop count value LC of related art failing to be a multiple of n are provided, the division operation is correctly performed through the correction process of the dividend, the divisor, and the loop count value by the pre-operation circuit 100. More specifically, the pre-operation circuit 100 calculates the correction loop count value LC' by correcting the loop count value LC of related art, and the number of repetition of n-bit partial quotient calculation operations on the division loop circuit 200 becomes a multiple of n. Even if the number of repetition of n-bit partial quotient calculation operations increases as a result of correction to the loop count value, the value of the dividend to be output to the division loop circuit 200 is corrected such that the final quotient is correctly calculated.

A specific example of division operation will be described below. FIG. 12 illustrates a division operation of related art with n=2.

Referring to FIG. 12, the dividend, the divisor, and the loop count value to be input to the division loop circuit 200 are determined in the pre-operation in the division operation of related art. If the dividend A is "1000 0111" ("135" in decimal notation), and the divisor B is "0011 1100" ("60" in decimal notation), the loop count value LC "3" is calculated in accordance with equation (1) on the related art pre-operation. The loop count value LC rather than the correction loop count value LC' is input to the division loop circuit 200. In the related art pre-operation, the dividend A and the divisor B are shifted leftward by the respective zero count values, and the dividend A' and the divisor B' to be input to the division loop circuit 200 subsequent to the pre-operation are respectively "1000 0111", and "1111 0000".

In a first n-bit partial quotient calculation operation (operations S23 to S28 illustrated in FIG. 11), the division loop circuit 200 calculates "01" as the partial quotient D, and subtracts 2 from the loop count value LC to result in "1". In a second n-bit partial quotient calculation operation, "00" is obtained as the partial quotient D, but the loop count value LC becomes "−1". An interim quotient D' of "0100" ("4" in decimal notation) is obtained, but this value is not the correct final quotient. If the loop count value LC is not a multiple of n in the division loop operation based on the related-art pre-operation, no correct final quotient is reached with the loop count value LC directly obtained.

FIG. 13 illustrates an example of division of n=2 with a pre-operation of an embodiment applied.

Referring to FIG. 13, the pre-operation circuit 100 of an embodiment receives a dividend A "1000 0111" and a divisor "0011 1100" as in the same manner as in FIG. 12. The absolute value operation (operation S11 in FIG. 8) absolute-value processes the dividend A and the divisor B, and the zero extension operation (operation S12 in FIG. 8) extends the upper bit portion of each of the absolute dividend A and divisor B by 1 bit. The zero count value calculation operation (operation S13) is performed on the zero extended dividend and divisor. The correction value CR is then calculated (operation S14). Referring to FIG. 13, the absolute dividend and divisor are respectively "0 1000 0111", and "0 0011 1100", and the correction value CR becomes "1". The loop count value LC of related art based on the dividend and the divisor becomes "3", and is not a multiple of n (=2).

The absolute dividend and divisor are converted through the shift operation (operation S15) respectively to "0 1000 0111" and "1 1110 0000", which are output to the division loop circuit 200 as the dividend A' and the divisor B'. The correction loop count value LC' is calculated as "4" based on the calculated correction value CR (operation S16).

Through the process of the pre-operation circuit 100, the loop count value LC is corrected to be a multiple of n. The left shifter 131 shifts leftward the dividend such that the most significant bit is 1, and the right shifter 133 shifts rightward the leftward-shifted dividend by the correction value CR. The dividend A' to be input to the division loop circuit 200 has from the most significant bit thereof. 0s of the number equal to the correction value CR.

At the first n-bit partial quotient calculation operation (operations S23 to S30 in FIG. 11), the division loop circuit 200 calculates the partial quotient D to be "00", and subtracts 2 from the correction loop count value LC' to result in "2". At the second n-bit partial quotient calculation operation, the partial quotient D is calculated to be "10". Since the correction loop count value LC' becomes "0", the division loop operation ends. The interim quotient D' at the end of the loop operation is "0010" ("2" in decimal notation) and this value is the correct final quotient.

The correction loop count value LC' becomes 0 at the end of a specific n-bit partial quotient calculation operation if the correction loop count value LC' calculated by the pre-operation circuit 100 is used. Each of the subtractor circuits 211 and 212 in the division loop circuit 200 performs practically the comparison operation, and the comparison results are output as carry-outs. As previously discussed, the right shifter 133 in the pre-operation circuit 100 corrects the most significant bit of the dividend to be 0. For this reason, the carry-out from the subtractor circuit 212 naturally becomes 0 in the first n-bit partial quotient calculation operation of the division loop circuit 200. As a result, an upper 1 bit of the calculated partial quotient becomes reliably 0. More specifically, the correction by the right shifter 133 causes a partial quotient abundantly calculated at the upper bits of the interim quotient in response to an increase in the loop count value to be reliably 0. Regardless of the values of the dividend A and the divisor B input to the pre-operation circuit 100, the division loop circuit 200 can constantly perform a correct division operation.

The advantage described above is provided by modifying only the pre-operation circuit 100 without affecting the process subsequent to the division loop operation and the circuit arrangement of the other circuits. For example, the process of the pre-operation circuit 100 is rather simplified in comparison with the quotient fix operation 940 of FIG. 26, and the remainder fix operation 922 of FIG. 27. The circuit scale, power consumption, and latency time are thus controlled.

An embodiment has been discussed with 2=n. With the pre-operation circuit 100 used, a correct final quotient can be calculated in response to any value of n in the division loop operation. FIGS. 14 and 15 illustrate numerical examples when the Radix-16 division operation with n=4, j=1, and k=4 is executed based on the recovery division method.

FIG. 14 illustrates a related-art division operation with n=4.

Referring to FIG. 14, the dividend, the divisor and the loop count value to be input to a division loop circuit with n=4 are determined through a related-art pre-operation. If the dividend A is "0011 0111 0001" ("881" in decimal notation), and the divisor B is "0000 0011 1111" ("63" in decimal notation), the loop count value LC is calculated to be "5" in accordance with the related-art pre-operation. The loop count value LC is then input to the division loop circuit. In the related-art pre-operation, the dividend A and the divisor B are shifted leftward by the respective zero count values. After the pre-operation, the dividend A' and the divisor B' to be input to the division loop circuit are respectively "1101 1100 0100", and "1111 1100 0000".

At a first n-bit partial quotient calculation operation, the division loop circuit calculates the partial quotient D to be "0110" and subtracts 4 from the loop count value LC, resulting in "1". At a second n-bit partial quotient calculation operation, the division loop circuit calculates the partial quotient D to be "1111" and results in a loop count value LC of "−3". A resulting interim quotient D' is "0110 1111" ("111" in decimal notation), but this value is not a correct final quotient. Since the loop count value LC is not a multiple of n, no correct final quotient is reached if the related-art pre-operation is applied.

FIG. 15 illustrates a division with n=4 with the pre-operation of an embodiment applied.

Referring to FIG. 15, the same values for the dividend A and the divisor B, namely, "0011 0111 0001", and "0000 0011 1111" as those illustrated in FIG. 14 are input to the pre-operation circuit 100 of an embodiment. The absolute value operation (operation S11 in FIG. 8) absolute-value processes the dividend A and the divisor B, and the zero extension operation (operation S12 in FIG. 8) extends the upper bit portion of each of the absolute dividend A and divisor B by 3 bits. The zero count value calculation operation (operation S13) is performed on the zero extended dividend and divisor. The correction value CR is then calculated (operation S14). Referring to FIG. 15, the dividend and divisor subsequent to the absolute value operation are respectively "000 0011 0111 0001", and "000 0000 0011 1111", and the correction value CR becomes "3".

The absolute dividend and divisor are converted through the shift operation (operation S15) respectively to "000 1101 1100 0100" and "111 1110 0000 0000", which are output to the division loop circuit as the dividend A' and the divisor B'. The correction loop count value LC' is calculated as "8" based on the calculated correction value CR (operation S16).

Through the process of the pre-operation circuit 100, the loop count value LC is corrected to be a multiple of n. The left shifter 131 shifts leftward the dividend such that the most significant bit is 1, and the right shifter 133 shifts rightward the leftward-shifted dividend by the correction value CR. The dividend A' to be input to the division loop circuit 200 has from the most significant bit thereof. 0s of the number equal to the correction value CR.

At the first n-bit partial quotient calculation operation, the division loop circuit 200 calculates the partial quotient D as "0000", and the correction loop count value LC' becomes "4" with "4" subtracted therefrom. At the second n-bit partial quotient calculation operation, the partial quotient D is calculated to be "1101". Since the correction loop count value LC' becomes "0", the division loop operation ends. The interim quotient D' at the end of the loop operation is "0000 1101" ("13" in decimal notation) and this value is the correct final quotient.

The Radix-16 division may be executed by using the following division loop circuit. The number of stages of subtractor circuits for the divisor B' (corresponding to the subtractor circuits 211 and 212) is increased to four in order to cause the division loop circuit 200 of FIG. 9 to work with the Radix-16 division with n=4, j=1, and k=4. Three selectors (corresponding to the selector 224) are arranged to select a subtraction target responsive to a carry-out from the subtractor circuit. The decoder 226 receives carry-outs from the four subtractor circuits, and outputs a 4-bit partial quotient in response to a combination of the input carry-outs, and outputs select signals SEL of 16 types. The selector 225 selecting the interim remainder C receives 16 inputs and selects one of these inputs in response to the select signal SEL from the decoder 226. Each time a 4-bit partial quotient calculation operation is executed, 4 is subtracted from the correction loop count value LC'.

Figure 16:
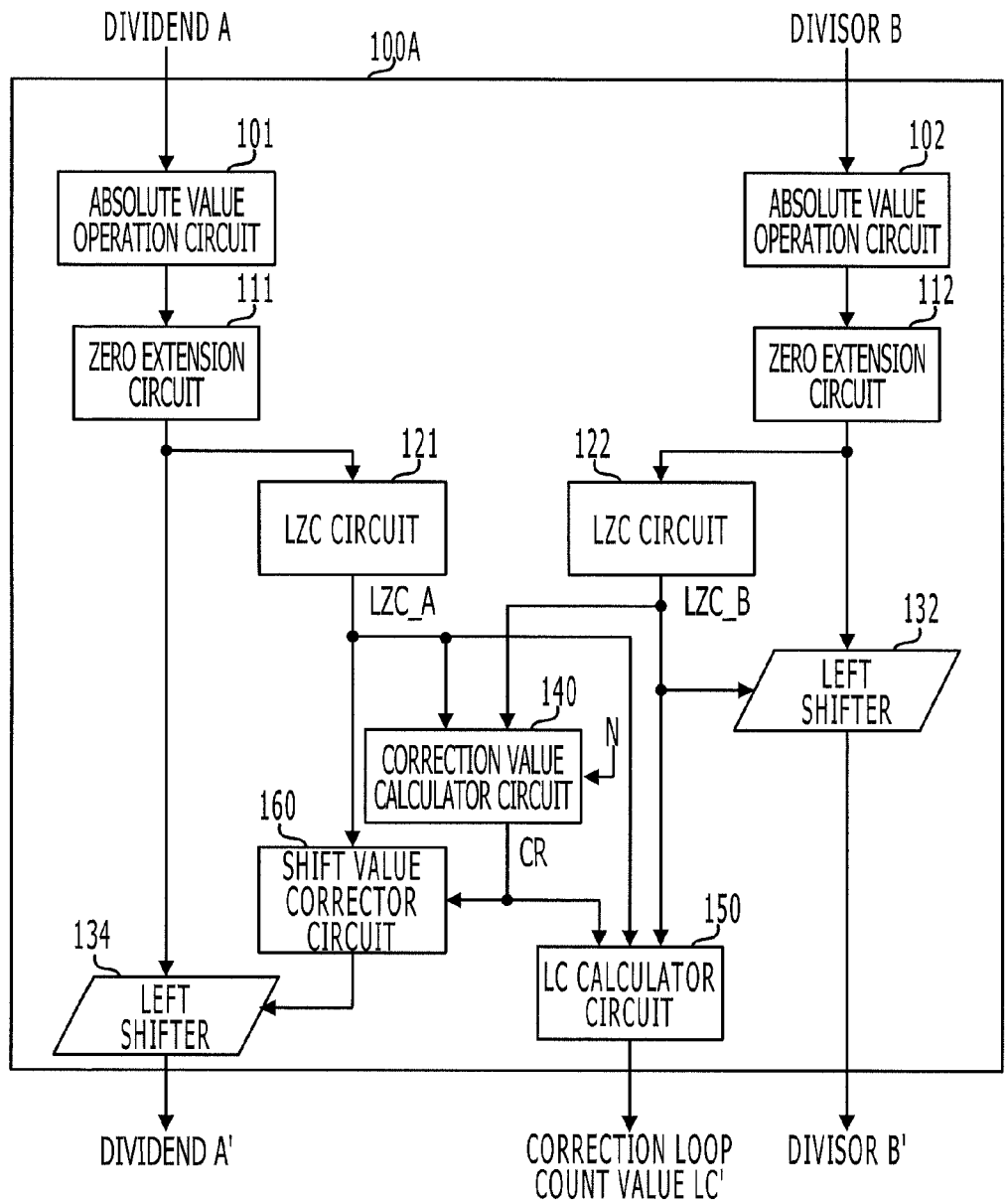
FIG. 16 illustrates a structure of a pre-operation circuit according to an embodiment.

FIG. 16 illustrates a structure of a pre-operation circuit 100a in accordance with an embodiment. In FIG. 16, elements identical to those illustrated in FIG. 3 are designated with the same reference numerals.

The pre-operation circuit 100a of FIG. 16 can replace the pre-operation circuit 100 in the divider circuit 2, and is constructed by partially modifying the pre-operation circuit 100 of FIG. 3. The pre-operation circuit 100a includes a left shifter 134 in place of the left shifter 131 and the right shifter 133 of FIG. 3. The left shifter 134 functions as the left shifter 131 and right shifter 133 of FIG. 3. The pre-operation circuit 100a also additionally includes a shift value corrector circuit 160 that calculates an amount of shift of the left shifter 134.

Figure 17:
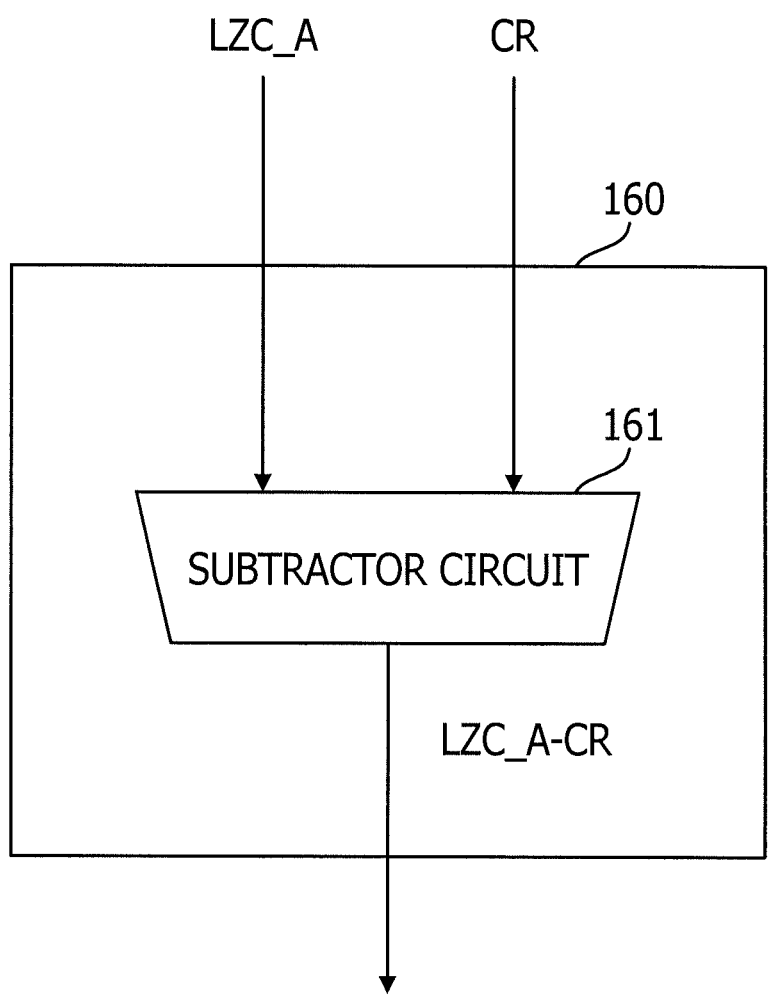
FIG. 17 illustrates an internal structure of a shift value corrector circuit.

FIG. 17 illustrates an internal structure of the shift value corrector circuit 160.

The shift value corrector circuit 160 includes a subtractor circuit 161. The subtractor circuit 161 subtracts the correction value CR calculated by the correction value calculator circuit 140 from the zero count value LZC_A calculated by the LZC circuit 121.

Figure 18:
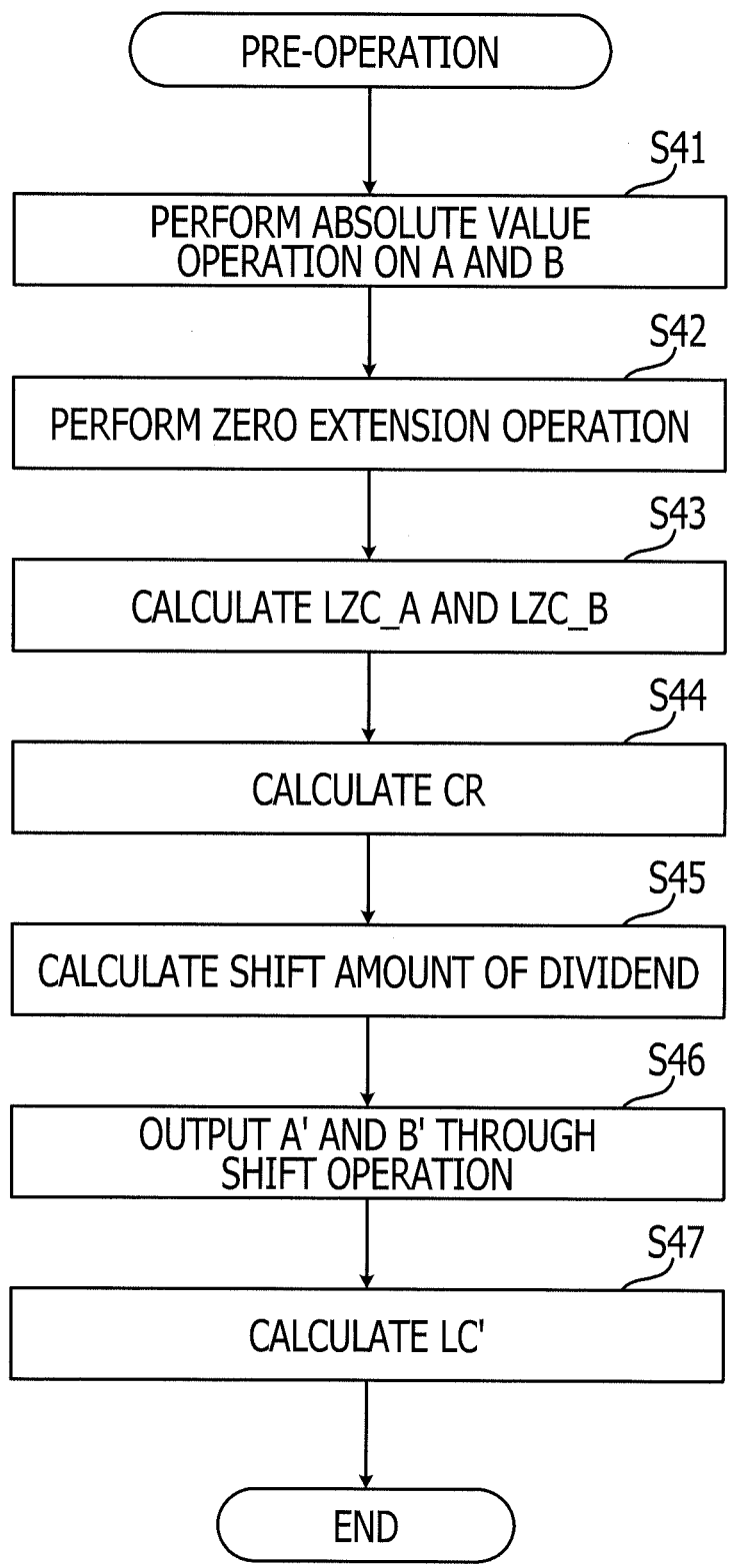
FIG. 18 is a flowchart illustrating the pre-operation of the pre-operation circuit according to an embodiment.

FIG. 18 is a flowchart illustrating a pre-operation of the pre-operation circuit 100a of an embodiment.

At operation S41, the absolute value operation circuit 101 performs an absolute value operation on the input dividend A. The absolute value operation circuit 102 performs an absolute value operation on the divisor B.

At operation S42, the zero extension circuit 111 receives into the internal latch circuit 113 thereof the absolute dividend A from the absolute value operation circuit 101, in response to a timing control signal from the control circuit 300. The zero extension circuit 112 receives into an internal latch circuit thereof the absolute divisor B from the absolute value operation circuit 102, in response to a timing control signal from the control circuit 300.

At operation S43, the LZC circuit 121 counts the number of 0s continued from the most significant bit of the output value of the zero extension circuit 111, and then outputs the zero count value LZC_A. The LZC circuit 122 counts the number of 0s continued from the most significant bit of the output value of the zero extension circuit 112 and outputs the zero count value LZC_B.

At operation S44, the correction value calculator circuit 140 calculates the correction value CR in accordance with equation (2) in response to the zero count values LZC_A and LZC_B respectively output by the LZC circuits 121 and 122, and the preset value of n.

At operation S45, the shift value corrector circuit 160 subtracts the correction value CR output by the correction value calculator circuit 140 from the zero count value LZC_A output by the LZC circuit 121, and calculates a shift amount of the left shifter 134.

At operation S46, the left shifter 134 shifts leftward the output value of the absolute value operation circuit 101 by the output value of the shift value corrector circuit 160, and outputs the leftward-shifted value as the dividend A' to the division loop circuit 200. The left shifter 132 shifts leftward the output value of the absolute value operation circuit 102 by the zero count value LZC_B output by the LZC circuit 122 and outputs the leftward-shifted value as the divisor B' to the division loop circuit 200.

The shift operation of the left shifter 132 may be performed prior to the calculation of the correction value CR.

At operation S47, the LC calculator circuit 150 calculates the correction loop count value LC' in accordance with equation (3) on the basis of the zero count values LZC_A and LZC_B respectively output by the LZC circuits 121 and 122 and the correction value CR output by the correction value calculator circuit 140. The calculation results are output to the division loop circuit 200.

The operation of operation S47 may be performed at any timing subsequent to operation S44.

The pre-operation circuit 100a corrects the dividend and the loop count value in the same manner as with the pre-operation circuit 100 of an embodiment. Regardless of the values of the dividend A and the divisor B, a correct final quotient is obtained by outputting the dividend A', the divisor B', and the correction loop count value LC' from the pre-operation circuit 100a to the division loop circuit 200. In the same manner as with an embodiment, a circuit structure of repeating the n-bit partial quotient calculation operation with n=k may be applied to the division loop circuit 200.

Figure 19:
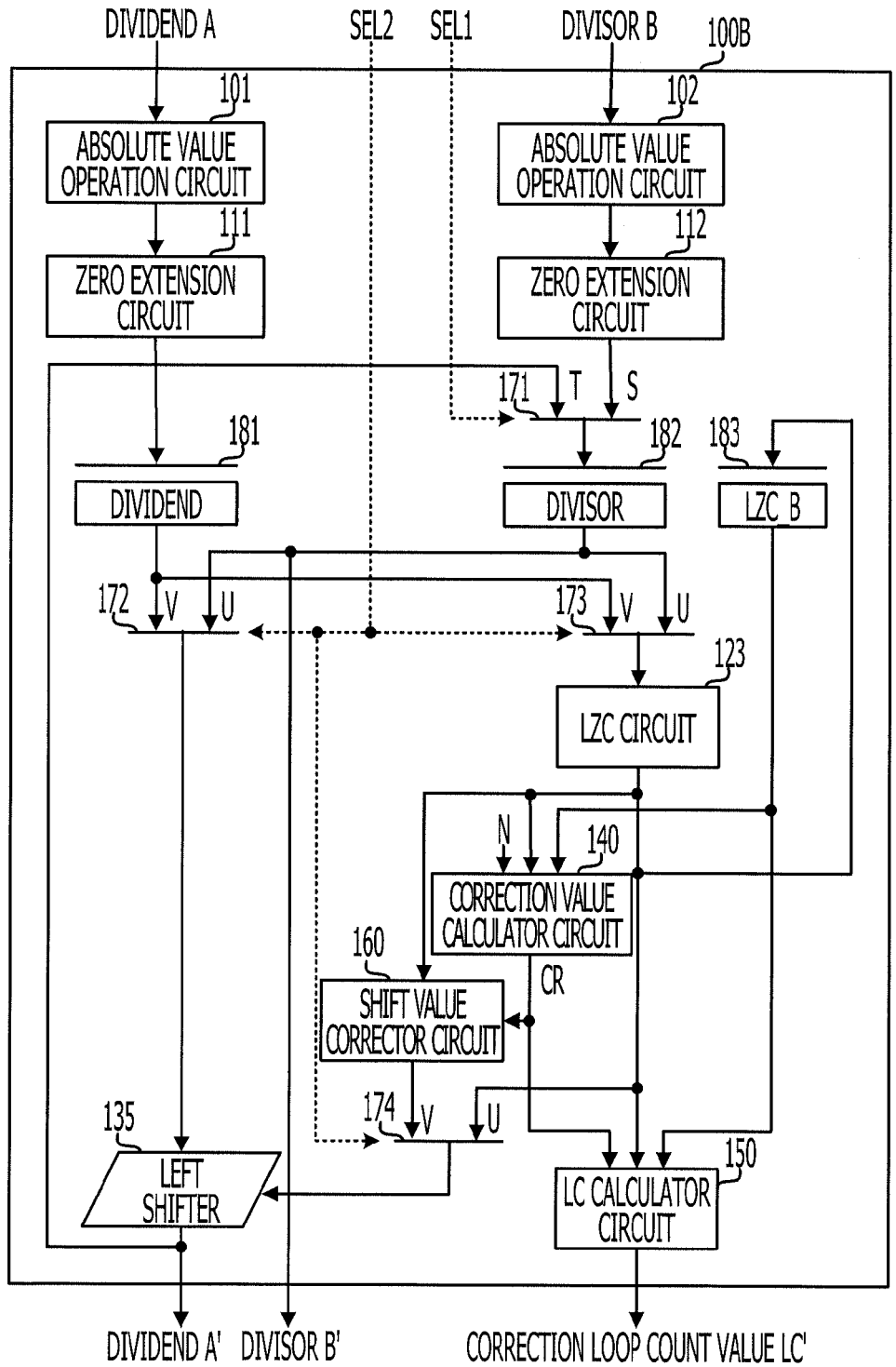
FIG. 19 illustrates a structure of a pre-operation circuit according to an embodiment.

FIG. 19 illustrates a structure of a pre-operation circuit 100b of an embodiment. In FIG. 19, elements identical to those illustrated in FIGS. 3 and 16 are designated with the same reference numerals.

The pre-operation circuit 100b of FIG. 19 can replace one of the pre-operation circuit 100 of FIG. 3 and the pre-operation circuit 100a in the divider circuit 2 of an embodiment. The pre-operation circuit 100b includes absolute value operation circuits 101 and 102, zero extension circuits 111 and 112, an LZC circuit 123, a left shifter 135, a correction value calculator circuit 140, a shift value corrector circuit 160, selectors 171 to 174, and latch circuits 181 to 183.

The divisor B, after being absolute-value processed by the absolute value operation circuit 102 and zero extended by the zero extension circuit 112, is input to one input terminal "s" of the selector 171. Another input terminal "t" of the selector 171 receives an output value of the left shifter 135. In response to a select signal SEL1 from the control circuit 300, the selector 171 selectively outputs the input values to the input terminals "t" and "5". The latch circuit 182 holds an output value of the selector 171 in response to a timing control signal (not illustrated) from the control circuit 300.

The dividend A, after being absolute-value processed by the absolute value operation circuit 101, and zero extended by the zero extension circuit 111, is input to the latch circuit 181. The latch circuit 181 holds an output value of the absolute value operation circuit 101 in response to a timing control signal (not illustrated) from the control circuit 300.

Each of the selectors 172 and 173 has input terminals "u" and "v" and selectively outputs input values to the terminal "u" and "v" in response to a select signal SEL2 from the control circuit 300, respectively. The value held by the latch circuit 182 is input to the input terminal "u" of each of the selectors 172 and 173, and the value held by the latch circuit 181 is input to the input terminal "v" of each of the selectors 172 and 173.

The LZC circuit 123 counts the number of 0s continued from the most significant bit of an output value of the selector 173 and then outputs the zero count value. The LZC circuit 123 is an integrated circuit that counts the zero count values LZC_A and LZC_B. If the input terminal "u" is selected on the selector 173, the LZC circuit 123 calculates the zero count value LZC_B of the divisor. If the input terminal "v" is selected on the selector 173, the LZC circuit 123 calculates the zero count value LZC_A of the dividend.

In response to a timing control signal (not illustrated) from the control circuit 300, the latch circuit 183 holds the zero count value LZC_B output by the LZC circuit 123.

The correction value calculator circuit 140 calculates the correction value CR in accordance with equation (2), based on the zero count value LZC_A output by the LZC circuit 123, the zero count value LZC_B held by the latch circuit 183, and the preset value of n.

The shift value corrector circuit 160 calculates a left shift value for the dividend. More specifically, the shift value corrector circuit 160 subtracts the correction value CR output by the correction value calculator circuit 140 from the zero count value LZC_A output by the LZC circuit 123.

The selector 174 receives the zero count value LZC_B from the LZC circuit 123 at one terminal "u" thereof. The selector 174 receives the output value of the shift value corrector circuit 160 at the other terminal "v" thereof. In response to the select signal SEL2 from the control circuit 300, the selector 174 selectively outputs the input values to the input terminals "u" and "v".

The left shifter 135 shifts leftward an output value of the selector 172 by an output value of the selector 174. The left shifter 135 is an integrated left shifter that shifts leftward the dividend and the divisor. If the input terminal "u" is selected in each of the selectors 172 and 174, the left shifter 135 shifts leftward the divisor held by the latch circuit 182 by the zero count value LZC_B. If the input terminal "v" is selected in each of the selectors 172 and 174, the left shifter 135 shifts leftward the dividend by the output value of the shift value corrector circuit 160.

The LC calculator circuit 150 calculates the correction loop count value LC' in accordance with equation (3), based on the zero count value LZC_A output by the LZC circuit 123, the zero count value LZC_B held by the latch circuit 183, and the correction value CR output by the correction value calculator circuit 140.

Figure 20:
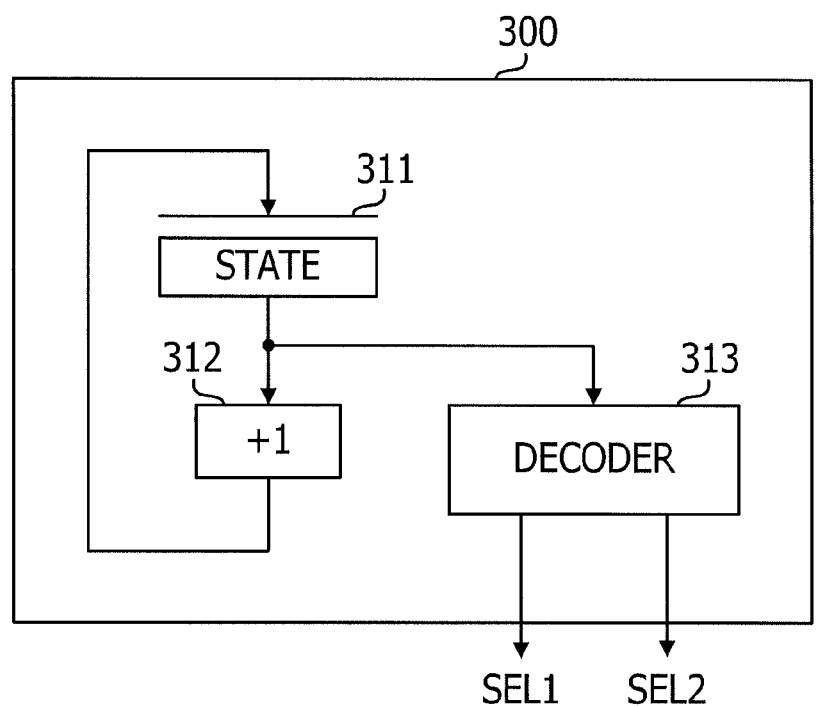
FIG. 20 illustrates a structure of a portion of a control circuit outputting a select signal.

FIG. 20 illustrates a structure of the control circuit 300 outputting the select signals in accordance with an embodiment.

The control circuit 300 includes a latch circuit 311, an adder circuit 312, and a decoder 313. The control circuit 300 manages the pre-operation circuit 100b and the division loop circuit 200 in one of the four control states ST0 to ST3. The latch circuit 311 holds a current control state, and the adder circuit 312 advances the control state held by the latch circuit 311 by one operation forward. The decoder 313 varies the output value of each of the select signals SEL1 and SEL2 in response to the control state held by the latch circuit 311.

FIG. 21 illustrates a correspondence between a control state and a select signal.

The control state transitions in the order of ST0, ST1, ST2, and ST3. ST0 to ST2 out of the four control states are control states in the pre-operation, and ST3 is a control state in the division loop operation.

In state ST0, the select signal SEL1 causes the input terminal "s" of the selector 171 selected. The output value of the select signal SEL2 is not set to be any particular value. In state ST1, the select signal SEL1 causes the input terminal "t" of the selector 171 selected, and the select signal SEL2 causes the input terminal "u" of each of the selectors 172 to 174 selected. In state ST2, the select signal SEL2 causes the input terminal "v" of each of the selectors 172 to 174 selected. The output value of the select signal SEL1 is not set to be any particular value. Since the division loop operation is performed in state ST3, the output values of the select signal SEL1 and the select signal SEL2 are not set to be any particular values.

Figure 22:
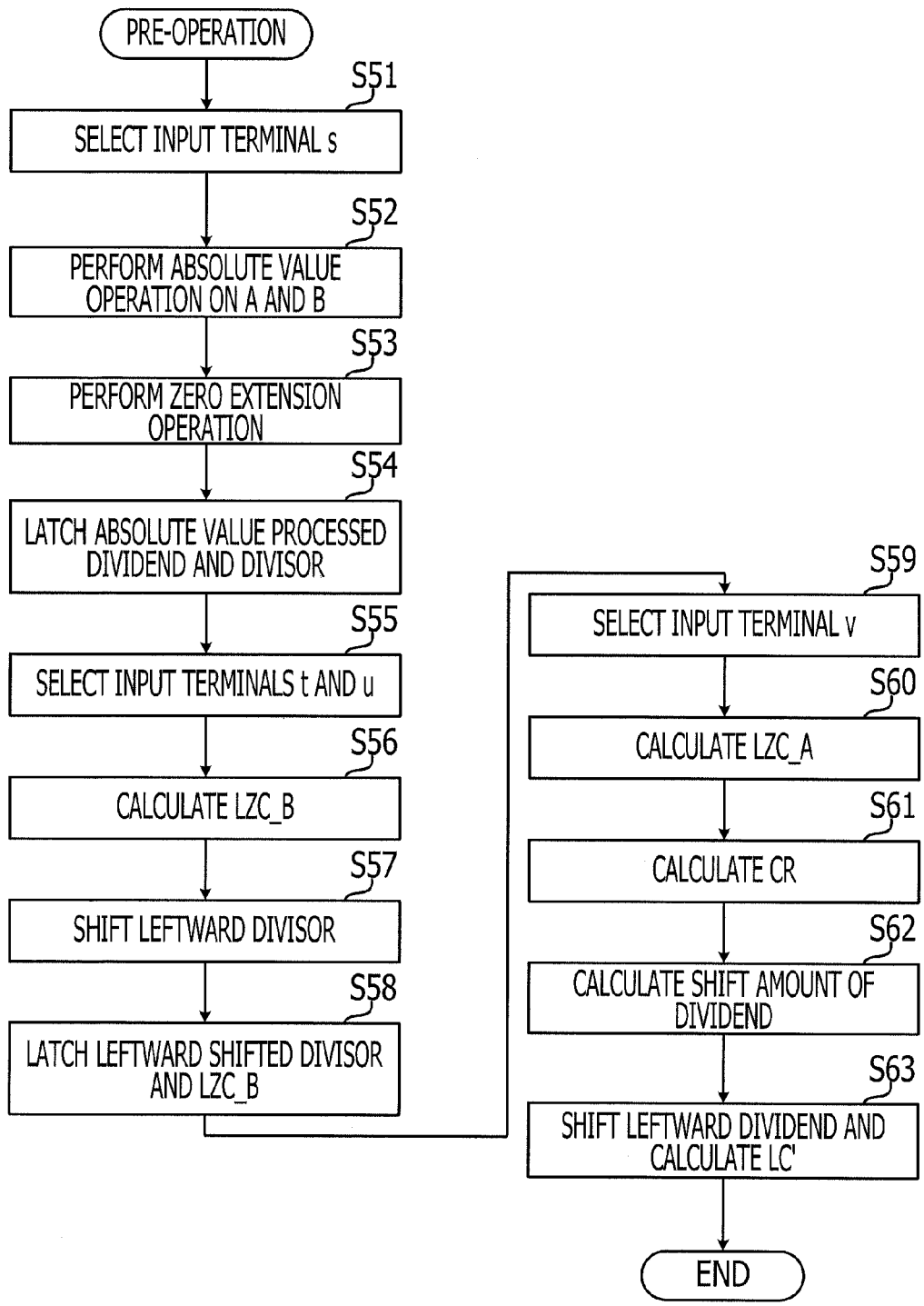
FIG. 22 is a flowchart illustrating the pre-operation of the pre-operation circuit according to an embodiment.

FIG. 22 is a flowchart illustrating a pre-operation of the pre-operation circuit 100b of an embodiment.

At operation S51, State ST0 is set as a control state on the latch circuit 311 in the control circuit 300. In response to the select signal SEL1 output by the decoder 313, the selector 171 selects the input terminal "s".

At operation S52, the absolute value operation circuit 101 performs an absolute value operation to absolute-value process an input dividend A. The absolute value operation circuit 102 performs an absolute value operation to absolute-value process an input divisor B.

At operation S53, in response to a timing control signal from the control circuit 300, the zero extension circuit 111 captures into the internal latch circuit thereof the absolute dividend A from the absolute value operation circuit 101. In response to a timing control signal from the control circuit 300, the zero extension circuit 112 captures into the internal latch circuit thereof the absolute divisor B from the absolute value operation circuit 102.

At operation S54, the latch circuit 181 holds the dividend output by the zero extension circuit 111 in response to a timing control signal from the control circuit 300. In response to a timing control signal from the control circuit 300, the latch circuit 182 holds the divisor input from the zero extension circuit 112 via the selector 171.

At operation S55, State ST1 is set on the latch circuit 311 in the control circuit 300. The selector 171 selects the input terminal "t" in response to the select signal SEL1 output by the decoder 313. The selectors 172 to 174 select the input terminals "u" in response to the select signal SEL2 output by the decoder 313.

At operation S56, the LZC circuit 123 calculates the zero count value LZC_B based on the divisor input from the latch circuit 182 via the selector 173.

At operation 57, the left shifter 135 shifts leftward the divisor input from the latch circuit 182 via the selector 172 by the zero count value LZC_B input from the LZC circuit 123 via the selector 174.

At operation S58, in response to a timing control signal from the control circuit 300, the latch circuit 182 holds the divisor input from the left shifter 135 via the selector 171. In response to a timing control signal from the control circuit 300, the latch circuit 183 holds the zero count value LZC_B calculated by the LZC circuit 123.

At operation S59, State ST2 is set as a control state on the latch circuit 311 in the control circuit 300. The selectors 172, 173, and 174 select the input terminals "v" in response to the select signal SEL2 output by the decoder 313.

At operation S60, the LZC circuit 123 calculates the zero count value LZC_A based on the dividend input by the latch circuit 181 via the selector 173.

At operation S61, the correction value calculator circuit 140 calculates the correction value CR, based on the zero count value LZC_A calculated by the LZC circuit 123, the zero count value LZC_B held by the latch circuit 183, and the value of n.

At operation S62, the shift value corrector circuit 160 subtracts the correction value CR calculated by the correction value calculator circuit 140 from the zero count value LZC_A calculated by the LZC circuit 123, and calculates an amount of shift of the dividend.

At operation S63, the left shifter 135 shifts leftward the dividend, input from the latch circuit 181 via the selector 172, by the amount of shift input from the shift value corrector circuit 160 via the selector 174. The LC calculator circuit 150 calculates the correction loop count value LC', based on the zero count value LZC_A calculated by the LZC circuit 123, the zero count value LZC_B held by the latch circuit 183, and the correction value CR calculated by the correction value calculator circuit 140.

When an operation of operation S63 is completed, the output value from the left shifter 135 as the dividend A' and the output value from the latch circuit 182 as the divisor B' are respectively input to the division loop circuit 200. The correction loop count value LC' from the LC calculator circuit 150 is also input to the division loop circuit 200. When the dividend A', the divisor B', and the correction loop count value LC' are held on the division loop circuit 200, state ST3 is set as a control state on the latch circuit 311 in the control circuit 300. The division loop operation thus starts.

The pre-operation circuit 100b corrects the dividend and the loop count value in the same manner as the pre-processing circuit 100 of an embodiment does. The pre-operation circuit 100b outputs to the division loop circuit 200 the dividend A', the divisor B', and the correction loop count value LC', thereby resulting in a correct final quotient regardless of the values of the dividend A and the divisor B. In the same manner as in the above-described embodiments, the circuit structure for repeating the n-bit partial quotient calculation operation with n=k is applicable as the division loop circuit 200.

The function and process content of each of the processor 1 of an embodiment, and the divider circuit 2 of each of the above-described embodiments can be implemented by causing an information processing apparatus such as a computer to execute a program in which the process content is described. An embodiment relates to a computer 400 as an example of information processing apparatus and the process of the computer 400 is discussed below.

Figure 23:
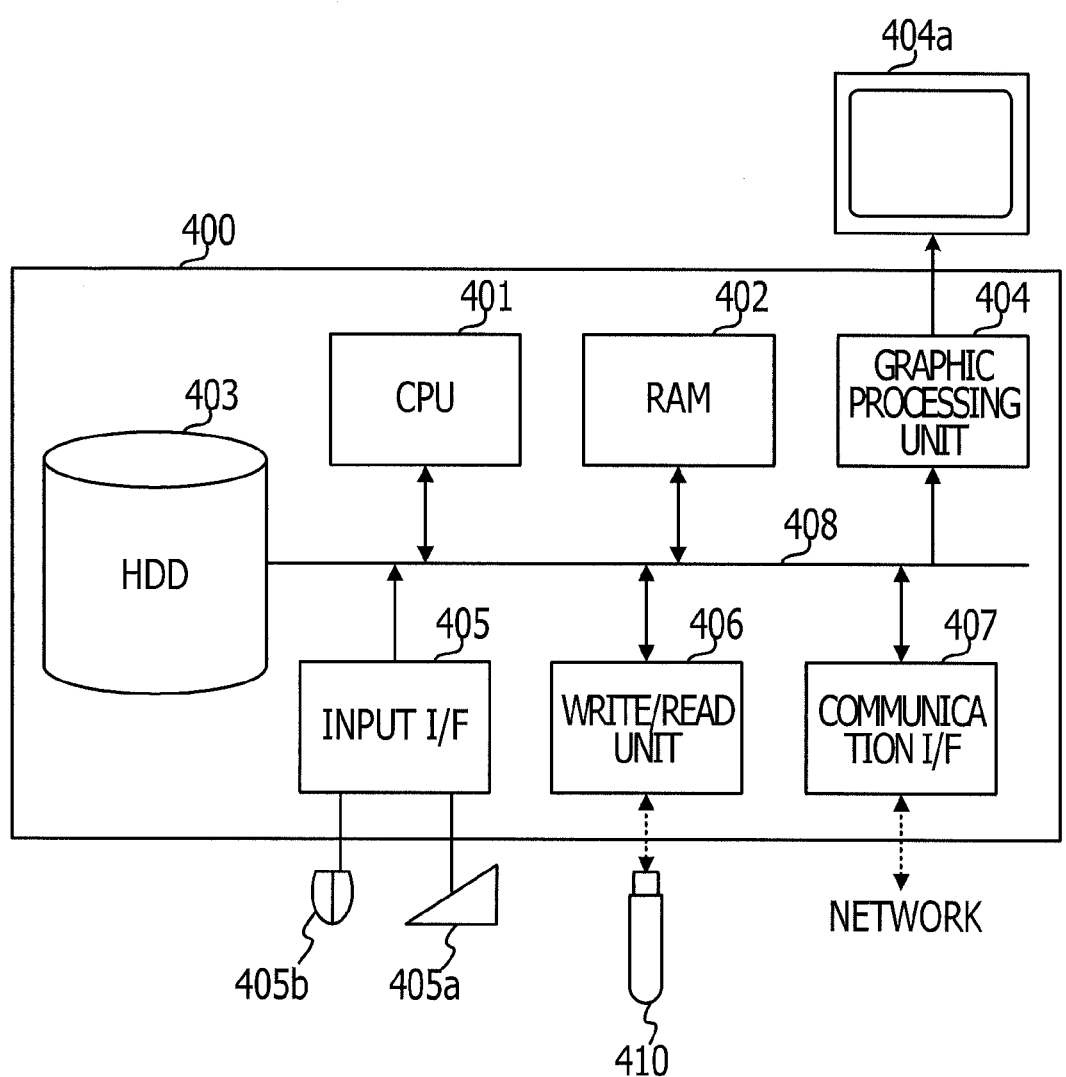
FIG. 23 illustrates a hardware structure of a computer.

FIG. 23 illustrates a hardware structure of the computer 400.

The computer 400 includes a central processing unit (CPU) 401, a random-access memory (RAM) 402, a hard disk drive (HDD) 403, a graphic processing unit 404, an input interface (I/F) 405, a write/read unit 406, and a communication interface 407. These elements are interconnected to each other via a bus 408.

The CPU 401 generally controls the computer 400 by executing a variety of programs stored on a storage medium such as the HDD 403. The RAM 402 temporarily stores part of the program to be executed by the CPU 401, and a variety of data for the process of the program. The HDD 403 stores the program to be executed by the CPU 401 and a variety of data for the execution of the program.

The graphic processing unit 404 connects to a monitor 404a, for example. The graphic processing unit 404 displays an image on a screen of the monitor 404a in response to an instruction from the CPU 401. The input interface 405 also connects to a keyboard 405a, a mouse 405b, etc. The input interface 405 transmits a signal from each of the keyboard 405a and the mouse 405b to the CPU 401 via the bus 408.

The write/read unit 406 writes data received from the CPU 401 via the bus 408 onto a portable storage medium 410. The write/read unit 406 reads data from the portable storage medium 410 and transmits the read data to the CPU 401 via the bus 408. The portable storage medium 410 may be one of an optical disk, a flexible disk, a semiconductor memory connected to the computer 400 via a universal serial bus (USB) interface, or the like.

The communication interface 407 exchanges data with an external device via a network.

Figure 24:
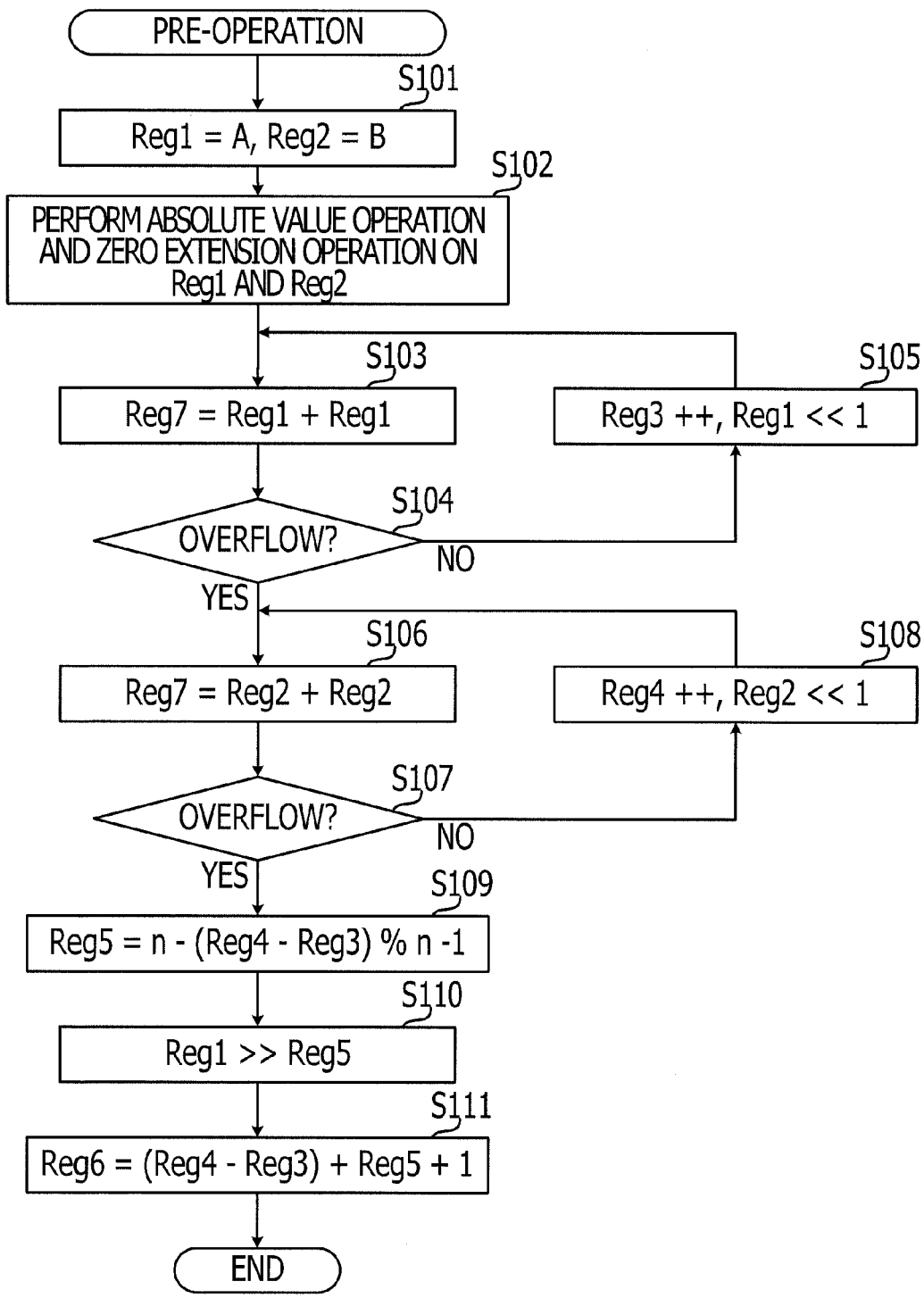
FIG. 24 is a flowchart illustrating a pre-operation of a computer.
Figure 25:
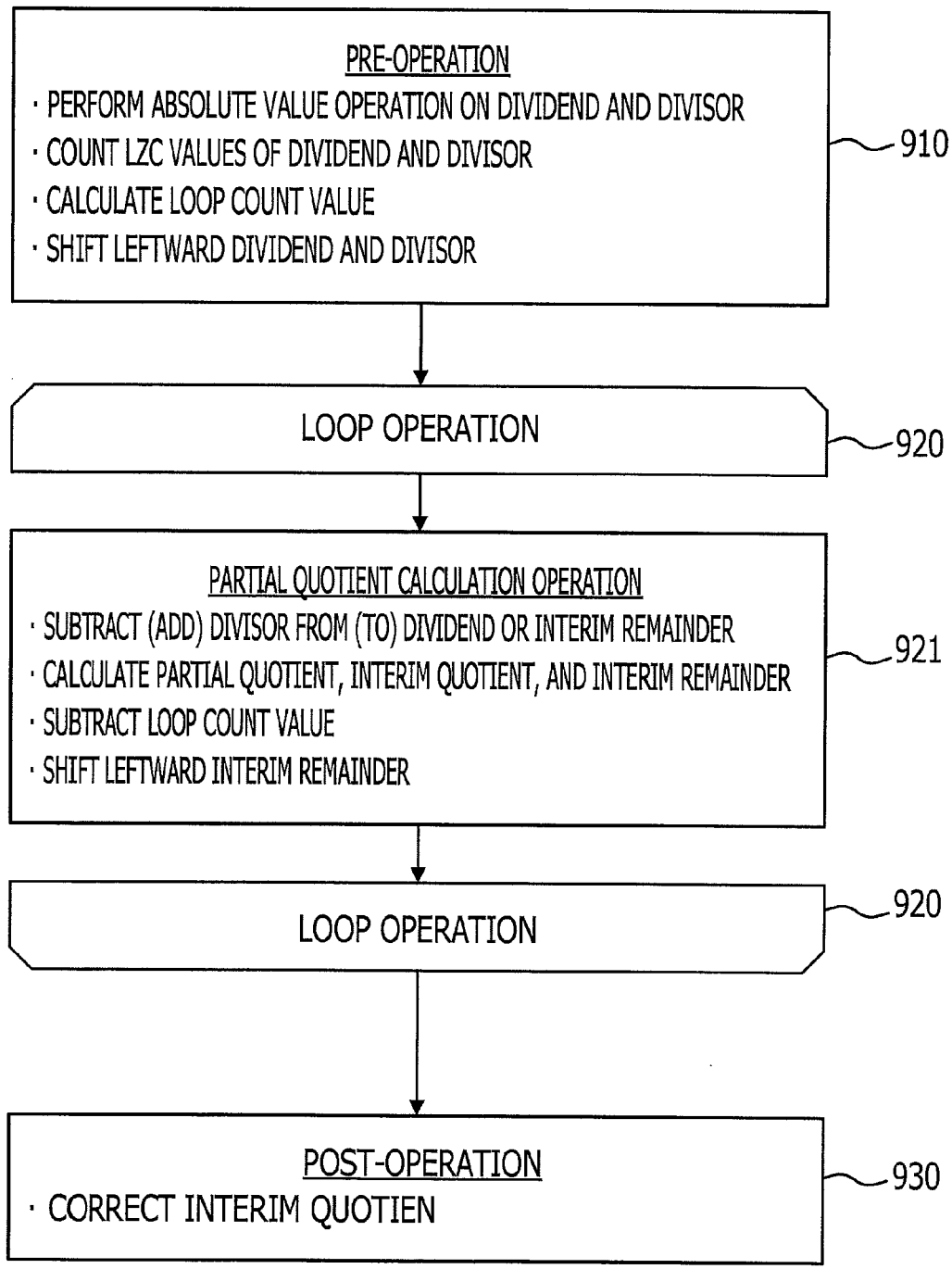
FIG. 25 illustrates a division operation based on a loop operation.

FIG. 24 is a flowchart of a pre-operation of the computer 400. The pre-operation of FIG. 24 may be performed when the CPU 401 executes a specific program stored on the HDD 403 or the like. Variables Reg1 to Reg7 illustrated in FIG. 24 are stored on respective storage regions arranged on one of the RAM 402 and the HDD 403.

At operation S101, the CPU 401 substitutes the dividend A for the variable Reg1 and the divisor B for the variable Reg2.

At operation S102, the CPU 401 absolute-value processes the variable Reg1 and writes back the absolute variable Reg1 as the variable Reg1. The CPU 401 extends the upper bits of the variable Reg1 by (n−1) bits, writes 0s for the extended bits, and then writes back the resulting value as the variable Reg1. The CPU 401 absolute-value processes the variable Reg2 and writes back the absolute variable Reg2 as the variable Reg2. The CPU 401 extends the upper bits of the variable Reg2 by (n−1) bits, writes 0s for the extended bits, and then writes back the resulting value as the variable Reg2.

At operation S103, the CPU 401 calculates (Reg1+Reg1), and substitutes the calculation results for the Reg7. In this calculation, an operation of multiplying the variable Reg1 by 2, or an operation of shifting leftward the variable Reg1 by 1 bit may be performed.

At operation S104, the CPU 401 determines whether an overflow has taken place in the calculation of operation S103. If no overflow has taken place, an operation of operation S105 is performed. If the overflow has taken place, an operation of operation S106 is performed.

At operation S105, the CPU 401 increments the value of the variable Reg3 by 1, and writes back the resulting value as the variable Reg3. The CPU 401 shifts leftward the variable Reg1 by 1 bit, and then writes back the resulting value as the variable Reg1. The operation of operation S103 is performed again.

If it is determined in operation S104 that an overflow has taken place, the variable Reg3 is the zero count value LZC_A of a dividend and the variable Reg1 is a value resulting from shifting leftward the variable Reg1 subsequent to operation S102 by the zero count value LZC_A.

At operation S106, the CPU 401 calculates "Reg2+Reg2" and substitutes the calculation results for the variable Reg7. In this calculation, an operation of multiplying the variable Reg2 by 2, or an operation of shifting leftward the variable Reg2 by 1 bit may be performed.

At operation S107, the CPU 401 determines whether an overflow has taken place as an operation result of operation S106. If no overflow has taken place, an operation of operation S108 is performed. If an overflow has taken place, an operation of operation S109 is performed.

At operation S108, the CPU 401 increments the value of the variable Reg4 by 1, and writes back the resulting value as the variable Reg4. The CPU 401 shifts leftward the variable Reg2 by 1 bit, and writes back the resulting value as the variable Reg2. The operation of operation S106 is performed again.

If it is determined in operation S107 that an overflow has taken place, the variable Reg4 is the zero count value LZC_B of a divisor, and the variable Reg2 is a value resulting from shifting leftward the variable Reg2 subsequent to operation S102 by the zero count value LZC_B.

At operations S103 to S105 may be performed subsequent to operations S106 to S108.

At operation S109, the CPU 401 calculates "n−(Reg4−Reg1) % n−1" to calculate the correction value CR, and substitutes the calculation results for the variable Reg6.

At operation S110, the CPU 401 shifts leftward the variable Reg1 by the variable Reg5.

At operation S111, the CPU 401 calculates "(Reg4−Reg1)+Reg5+1" to calculate the correction loop count value LC', and substitutes the calculation results for the variable Reg6.

The process order of operations S110 and S111 may be reversed.

Through the above-described process, the variable Reg1 is output as the dividend A', the variable Reg2 is output as the divisor B', and the variable Reg6 is output as the correction loop count value LC'. The division loop operation is performed based on these values.

In accordance with the above-described pre-operation, the dividend and the loop count value are respectively corrected in the same manner as with the pre-operation circuit 100 of an embodiment. The division loop operation is performed based on the dividend A', the divisor B', and the correction loop count value LC' calculated through the pre-operation. Thus, a correct final quotient is obtained regardless of the values of the dividend A, and the divisor B. The division loop operation may be a division procedure that repeats the n-bit partial quotient calculation operation with n=k. For example, the division loop operation may be one of the recovery division method, the non-recovery division method, and the SRT division method.

A method of performing an operation via a processor, includes calculating a first value and a second value counted from a most significant bit of an absolute value of a dividend and a divisor, shifting the absolute value of each of the dividend and the divisor relative to the calculating and performing a division operation based on an output value from the shifting relative to the dividend and the divisor and a correction value determined based on results of the calculating.

The function of the apparatus of each of the embodiments may be performed by a computer. In such a case, a program describing the process content of the function is supplied. The function is thus performed when the computer executes the program. The program describing the process content may be stored on a computer readable recording medium. The computer readable recording media include a magnetic recording device, an optical disk, a magneto-optical recording medium, a semiconductor memory, etc.

To circulate the program, a portable recording medium such as an optical disk having the program recorded thereon may be sold. The program may be stored on a storage device of a server computer and may then be transmitted from the server computer to another computer via a network.

The computer executing the program may store on a storage device therein the program from the portable recording medium or the program transferred from the server computer. The computer then reads the program from the storage device, and performs a process responsive to the program. The computer may read directly the program from the portable recording medium, and execute the process responsive to the program. The computer may successively perform a process responsive to a program each time the server computer transmits the program.

As such, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A hardware processor to perform a division operation to divide a dividend by a divisor by calculating, repeatedly, a partial quotient having an n-bit width, where n is an integer greater than one, the hardware processor comprising:

a dividend zero count value counter that bitwise counts a dividend zero count value as a number of zeros from a most significant bit of an absolute value of the dividend;

a divisor zero count value counter that bitwise counts a divisor zero count value as a number of zeros from a most significant bit of an absolute value of the divisor;

a correction value calculator that calculates a correction value to correct a loop count value to a multiple of n, using a value of n and a remainder that is obtained by dividing a difference between the dividend zero count value and the divisor zero count value by the value of n, the loop count value indicating a number of repetitions of calculating a partial quotient having a one-bit width, required for performing the division operation;

a correction loop count value calculator that calculates a correction loop count value having a value of a multiple of n, by adding the calculated correction value to the loop count value;

a dividend shift unit that bitwise shifts leftward the absolute value of the dividend by a shift amount value that is obtained by subtracting the correction value from the dividend zero count value;

a divisor shift unit that bitwise shifts leftward the absolute value of the divisor by the divisor zero count value; and a division loop operation unit that performs the division operation by repeating a calculation of a partial quotient having an n-bit width in accordance with the correction loop count value, using output values from the dividend shift unit and the divisor shift unit, so as to calculate a correct final quotient regardless of whether the loop count value is a multiple of n.

2. The processor according to claim 1, wherein the correction value calculator calculates a difference value by subtracting the dividend zero count value from the divisor zero count value, calculates a remainder by dividing the difference value by a value of n, subtracts the remainder from the value of n, and sets, as the correction value a value resulting from subtracting one from the difference between the value of n and the remainder.

3. The processor according to claim 1, wherein the correction loop count value calculator calculates the correction loop count value by adding the correction value to the loop count value that is calculated by adding 1 to a value resulting from subtracting the dividend zero count value from the divisor zero count value.

4. The processor according to claim 1, wherein the dividend zero count value counter and the divisor zero count value counter are integrated into a common zero count value counter that counts a number of zeros from a most significant bit of an input value, and wherein the processor includes:
a count target selector that selects one of the absolute value of the dividend and the absolute value of the divisor to the common zero count value counter; and
a controller that controls the selection by the count target selector.

5. The processor according to claim 4, wherein the dividend shift unit and the divisor shift unit are integrated into a common shift unit to shift an input value, wherein the processor includes:
a subtractor that subtracts the correction value from the dividend zero count value calculated by the common zero count value counter;
a shift amount selector that selectively inputs to the common shift unit one of an output value from the common zero count value counter and an output value from the subtractor as a shift amount by the common shift unit; and
a shift target selector that selectively inputs to the common shift unit one of the absolute value of the dividend and the absolute value of the divisor as a shift target of the common shift unit, and
wherein the controller controls synchronously selection operations of the count target selector, the shift amount selector, and the shift target selector.

6. The processor according to claim 5, wherein the controller causes the count target selector, the shift amount selector and the shift target selector to select respectively the absolute value of the divisor, the output value from the common zero count value counter, and the absolute value of the divisor, causes the common zero count value calculator to calculate the divisor zero count value, and causes the common shift unit to shift the absolute value of the divisor, and causes the count target selector, the shift amount selector, and the shift target selector to select respectively the absolute value of the dividend, the output value from the subtractor, and the absolute value of the dividend, causes the common zero count value counter to count the dividend zero count value, and causes the common shift unit to shift the absolute value of the dividend.

7. The processor according to claim 1, wherein the division loop operation unit repeatedly performs a partial quotient calculation operation to calculate a partial quotient of the n-bit width, based on an output value from the dividend shift unit and an output value from the divisor shift unit, subtracts the value of n from the correction loop count value each time the partial quotient calculation operation is performed, and performs repeatedly the partial quotient calculation operation until the correction loop count value has reached zero.

8. The processor according to claim 7, wherein the division loop operation unit performs a comparison operation n times in series on output values from the divisor shift unit in the partial quotient calculation operation.

9. The processor according to claim 1, comprising:
a dividend extension unit and a divisor extension unit, the dividend extension unit and the divisor extension unit extending respectively the absolute value of the dividend and the absolute value of the divisor in an upper bit direction that satisfies n−1 bits, and setting zeros to the extended digits,
wherein the dividend zero count value counter and the divisor zero count value counter respectively count the dividend zero count value and the divisor zero count value based on an output value from the dividend extension unit and an output value from the divisor extension unit, and
wherein the dividend shift unit and the divisor shift unit respectively shift the output value from the dividend extension unit and the output value from the divisor extension unit.

10. The processor according to claim 1, comprising:
a subtractor that subtracts the correction value from the dividend zero count value, and
wherein the dividend shift unit shifts leftward the absolute value of the dividend by a difference between the correction value and the dividend zero count value calculated by the subtractor.

11. The processor according to claim 1, wherein the dividend shift unit comprises:
a left shifter that shifts leftward the absolute value of the dividend by the dividend zero count value; and
a right shifter that shifts rightward an output value from the left shifter by the correction value.

12. A control method of a hardware processor to perform a division operation to divide a dividend by a divisor by calculating, repeatedly, a partial quotient having an n-bit width, where n is an integer greater than one, the hardware processor being configured to include a dividend zero count value counter, a divisor zero count value counter, a correction value calculator, a correction loop count value calculator, a dividend shift unit, a divisor shift unit, and a division loop operation unit, the control method comprising:

causing the dividend zero count value counter to bitwise count a dividend zero count value as a number of zeros from a most significant bit of an absolute value of the dividend;

causing the divisor zero count value counter to bitwise count a divisor zero count value as a number of zeros from a most significant bit of an absolute value of the divisor;

causing the correction value calculator to calculate a correction value to correct a loop count value to a multiple of n, using a value of n and a remainder that is obtained by dividing a difference between the dividend zero count value and the divisor zero count value by the value of n, the loop count value indicating a number of repetitions of calculating a partial quotient having a one-bit width, required for performing the division operation;

causing the correction loop count value calculator to calculate a correction loop count value having a value of a multiple of n, by adding the calculated correction value to the loop count value;

causing the dividend shift unit to bitwise shift leftward the absolute value of the dividend by a shift amount value that is obtained by subtracting the correction value from the dividend zero count value;

causing the divisor shift unit to bitwise shift leftward the absolute value of the divisor by the divisor zero count value; and causing the division loop operation unit to perform the division operation by repeating a calculation of a partial quotient having an n-bit width in accordance with the correction loop count value, using output values from the dividend shift unit and the divisor shift unit, so as to calculate a correct final quotient regardless of whether the loop count value is a multiple of n.

13. The control method according to claim 12, comprising calculating a difference value by subtracting the dividend zero count value from the divisor zero count value, calculating a remainder by dividing the difference value by a value of n, subtracting the remainder from the value of n, and setting, as the correction value a value resulting from subtracting one from the difference between the value of n and the remainder.

14. The control method according to claim 12, wherein the loop count value is calculated by adding the correction value to the loop count value that is calculated by adding 1 to a value resulting from subtracting the dividend zero count value from the divisor zero count value.

15. A non-transitory computer-readable recording medium storing a processing program causing a computer to perform an operation including a division operation to divide a dividend by a divisor by calculating, repeatedly, a partial quotient having an n-bit width, where n is an integer greater than one, the computer being configured to include a dividend zero count value counter, a divisor zero count value counter, a correction value calculator, a correction loop count value calculator, a dividend shift unit, and divisor shift unit, and a division loop operation unit the operation comprising:

causing the dividend zero count value counter to bitwise count a dividend zero count value as a number of zeros from a most significant bit of an absolute value of the dividend;

causing the divisor zero count value counter to bitwise count a divisor zero count value as a number of zeros from a most significant bit of an absolute value of the divisor;

causing the correction value calculator to calculate a correction value to correct a loop count value to a multiple of n, using a value of n and a remainder that is obtained by dividing a difference between the dividend zero count value and the divisor zero count value by the value of n, the loop count value indicating a number of repetitions of calculating a partial quotient having a one-bit width, required for performing the division operation;

causing the correction loop count value calculator to calculate a correction loop count value having a value of a multiple of n, by adding the calculated correction value to the loop count value;

causing the dividend shift unit to bitwise shift leftward the absolute value of the dividend by a shift amount value that is obtained by subtracting the correction value from the dividend zero count value;

causing the divisor shift unit to bitwise shift leftward the absolute value of the divisor by the divisor zero count value; and causing the division loop operation unit to perform the division operation by repeating a calculation of a partial quotient having an n-bit width in accordance with the correction loop count value, using output values from the dividend shift unit and the divisor shift unit, so as to calculate a correct final quotient regardless of whether the loop count value is a multiple of n.

* * * * *